United States Patent [19]
Vidaurre et al.

[11] Patent Number: 6,141,996
[45] Date of Patent: Nov. 7, 2000

[54] PSYCHROMETRIC APPARATUS AND METHOD FOR CONTINUOUS AIR REPLACEMENT/DEGASSING OF CONTINUOUS MULTILAYERED FIBERS WITH A CONDENSABLE GAS

[75] Inventors: Victor H. Vidaurre; Jorge L. Dufeu, both of Santiago, Chile

[73] Assignee: Mardela International Inc. S.A., Panama

[21] Appl. No.: 09/479,251

[22] Filed: Jan. 7, 2000

Related U.S. Application Data

[63] Continuation of application No. 09/094,046, Jun. 9, 1998.
[51] Int. Cl.[7] ....................................................... D06B 5/02
[52] U.S. Cl. .................................................. 68/5 D; 68/5 E
[58] Field of Search ...................... 8/150; 68/5 C, 68/5 D, 58, 13 R, 5 E

[56] References Cited

U.S. PATENT DOCUMENTS

| | | | |
|---|---|---|---|
| 3,927,540 | 12/1975 | Tanaka et al. | 68/5 E |
| 4,047,403 | 9/1977 | Von Der Eltz | 68/5 E |
| 4,087,992 | 5/1978 | Sando et al. | 68/5 E |
| 4,416,123 | 11/1983 | Sando et al. | 68/5 E |
| 4,457,145 | 7/1984 | Sando | 68/5 E |
| 4,507,539 | 3/1985 | Sando et al. | 68/5 E |
| 5,400,621 | 3/1995 | Smejda | 68/5 C |
| 5,709,910 | 1/1998 | Argyle et al. | 68/5 D |

FOREIGN PATENT DOCUMENTS

| | | | |
|---|---|---|---|
| 1030443 | 7/1983 | U.S.S.R. | 68/5 E |

*Primary Examiner*—Frankie L. Stinson
*Attorney, Agent, or Firm*—Rader, Fishman & Grauer PLLC

[57] ABSTRACT

The present invention discloses a generic method for producing void and gas occlusion free materials, as well as apparatuses for batch and continuous production of same. This generic method can be utilized in the production of a wide variety of polymeric compounds and composites and specifically encompasses the two ends of the polymeric composite spectrum, that is, polymer concretes on the one hand, and fiber-reinforced polymer composites on the other. The composite materials of the present invention are characterized by visual count as being void and gas occlusion free to the level of 1 micron at 1250× magnification. Concomitantly, the invention produces useful polymer concrete materials which exhibit substantially improved integrity for easy machining at high speeds, and high dielectric and mechanical strength, as compared with composite materials produced by conventional methods. Thus, one particularly well-suited application for the materials of the present invention is the class of high voltage electrical insulating materials and insulators where the presence of voids, or gas occlusion flaws, may have deleterious effects, leading to their early failure.

19 Claims, 12 Drawing Sheets

PSYCHROMETRIC APPARATUS AND METHOD FOR CONTINUOUS AIR REPLACEMENT/DEGASSING OF CONTINUOUS MULTILAYERED FIBERS WITH A CONDENSABLE GAS

This application is a continuation of copending application application Ser. No. 09/094,046 filed on Jun. 9, 1998, still pending.

BACKGROUND OF THE INVENTION

1. Field of the Invention

The present invention relates to gas occlusion-free and void-free, two-primary phase, solidifiable compounds, and derived void-free solidified composite materials, and more particularly to gas occlusion-free and void-free polymeric solidifiable compounds and derived void-free solidified composites, including methods and apparatus for producing same.

2. Description of Related Art a. Terminology

Because certain terms in the field of the invention may be used in different ways to signify the same or slightly differing concepts, the following definitions are provided to promote clarity for the following description of the invention.

The term "primary solid phase" is defined herein as one or more distinct solid substances each physically homogeneous, in solid state, which serves primarily as material reinforcement upon solidification of the primary liquid phase.

The term "primary solidifiable liquid phase" is defined herein as one or more distinct liquid substances, each physically homogeneous, in liquid state, capable of solidifying to constitute a solid continuous material matrix that binds the primary solid phase at ambient temperatures.

The term "compound" is defined as the unsolidified state of a composite.

The term "composite" is defined here as any solid primary phase mixed with any primary solidifiable liquid phase, forming a monolithic two-phase solid state material upon solidification of the liquid primary phase.

When the two primary phases are mixed to yield a compound, these primary phases are no longer in their primary state but in an unsolidified, multiphase, "mixed state" as defined herein.

The term "voids" are defined herein as filled or unfilled spaces, within interstices of a packed primary solid phase or surface pores in solid constituents. Voids are further defined as gas phase occlusions within a primary liquid phase originating from entrainment and/or adsorption of air, water vapor and other gases within the interstices of the solids in the primary solid phase, within the primary solidifiable liquid phase or within the multiphase, mixed unsolidified state of the two phases. The term "voids", as defined above, specifically excludes intermolecular and atomic spaces, which are natural unfilled spaces in matter. Furthermore, the scale of physical measurement of voids herein is about one micron ($10^{-6}$m) or more.

b. Polymeric Compounds and Composites

An extremely wide range of products are being manufactured today from a specific class of two primary phase compounds in which the primary solidifiable liquid phase is a polymeric resin. The process leading to the production of a polymeric composite involves mixing a generic primary solid phase with a polymeric resin system, thereby constituting a two-phase unsolidified compound. Upon further processing, the polymeric resin in the mixed unsolidified state is made to solidify, or harden, in an appropriate forming device, such as a mold or a die, yielding a formed, solid composite with the shape, or configuration, of the forming device.

The role of the polymeric liquid resin system in polymeric composites is to provide an essential binding matrix to the primary solid phase upon solidification. Initially, its low viscosity provides an adequate liquid medium for mixing with the solids of the primary solid phase. Upon solidification, the resin matrix provides a continuous solid phase that enables the composite to behave monolithically as a single solid material body.

Resin systems in polymeric composites are further classified as either thermoplastic, which soften when heated and may be shaped or reshaped while in a semifluid state or thermosetting, which are generally low viscosity liquids that solidify through chemical cross-linking. The most common resin systems in polymeric composites are thermosetting, and the most predominant thermosetting resin is unsaturated polyester. Other thermosetting resins include epoxies, vinylesters, phenolics and urethanes.

Certain thermosetting polymer resin systems consist of solid polymer particles dissolved in a low viscosity liquid and solvent monomer, for example, an unsaturated polyester dissolved in monostyrene. The monomer plays the dual role of providing a solvent medium for the distribution of the polymer resin, and also has the ability to react with the polymer into a final solid state. Such thermosetting resin systems are made to harden or solidify into a permanent shape by an irreversible chemical reaction known as curing or cross-linking, in which linear polymer chains and monomer chains in the liquid resin system are joined, or reacted, together to form complex, highly rigid, three-dimensional solid structures. This reaction requires anaerobic conditions; i.e., the liquid resin system will not harden in the presence of air. Thus the presence of $O_2$ is known to have an inhibitory effect on the polymerization/solidification process. Additionally, water, which is known to diffuse into liquid thermosetting resin systems, significantly impairs the cross linking solidification reaction.

An additional property of thermosets is that they are generally brittle. Thus, thermosets are rarely used without some form of solid reinforcement. However, high resistance to weight ratio, ability to solidify at ambient temperatures and retain their shape and properties at somewhat elevated temperature as, well as good creep resistance and corrosion resistance properties, give thermoset resin systems significant advantages over thermoplastics. These advantages essentially are the reasons for their preference in the developmental history of polymeric composites.

The role played by the solids in the primary solid phase matrix of polymeric composites is one of structural reinforcement. Moreover, the choice of geometrical shape of the solid phase constituents is a function of the intended reinforcement requirement of the particular polymeric composite in terms of the type of predominant stresses from externally applied forces that are to be resisted. The geometrical shape of the solid reinforcement generally can be of two generic classes: 1) filament shaped, or fiber and 2) granular/spherical shaped, or aggregate-type solid material. The fiber reinforced polymeric composites are intended for predominantly tensional, mechanical resistance applications, whereas the aggregate reinforced polymeric composites are intended for predominantly compressional, mechanical resistance applications. These generic classes of solids can be viewed as forming two ends of the structural resistance spectrum of polymeric composites.

Polymer composites composed of fibrous solid materials mixed with thermosetting polymeric resin are known as "Fiber Reinforced Polymers" or FRPs. The most common fibers used in the present art are glass, graphite, ceramic and polymeric fibers. Depending on the particular production process used, this generic class includes polymeric composite materials such as "Glass Reinforced Plastics" (GRP), produced by open, manual or spray, lay up methods, pultrusion, filament winding, etc. or by enclosed methods such as "Resin Transfer Molding" (RTM), Seeman Composites Resin Infusion Manufacturing Process (SCRIMP), etc. Other FRP composites produced by enclosed methods are based on polymeric compound materials, such as "Bulk Molding Compound" (BMC), "Sheet Molding Compound" (SMC), "Thick Molding Compound" (TMC), etc. In the mixed solidifiable compound state, the latter fiber reinforced polymeric materials, appropriately handled, can be stored for extended periods of time for future forming and curing at appropriate combinations of pressure and temperature into final solid composite products.

Solid aggregate materials mixed with thermosetting polymeric resin (resins) matrices comprise the generic class of polymeric composites known as cast polymer products, polymer concretes, polymer mortars or polymer grouts. To date, the inorganic aggregates for polymeric composites have not been systematically characterized, but most common aggregates used in the present art are siliceous. Silica aggregates are widely used in the production of polymer concretes due to their mechanical, dielectric and chemical resistance properties, as well as for their abundance and low cost.

Thermosetting polymeric composites offer inherent advantages over traditional materials (metals, cement concrete, wood, ceramics and natural inorganic materials), including energy efficiency, high strength-to-weight ratio, design flexibility, parts consolidation, corrosion resistance, high dielectric and thermal properties, excellent appearance, low maintenance and extended service life. A vast array of thermosetting polymeric composite products are currently available worldwide in over 50,000 successful applications developed over the past 45 years. Well over 95% of the U.S. production is dedicated to fiber reinforced polymeric composites, and the industry's shipments and growth are tracked under nine major market segments totaling over 3.2 billion pounds per year. Aggregate polymeric composites are widely used as cast materials for bath tubs, shower stalls, kitchen sinks and counters, flooring and decorative panels in construction. Cast polymer concrete products find use in specialized niche industrial applications, where the combination of high structural strength, corrosion and dielectric resistance is required.

Despite some differences, these two generic classes of polymeric composites have much in common in terms of certain characteristics and general behavior. Generally, the functional concepts and behavioral aspects of the polymeric resin systems are the same for both classes of generic composites, despite specific differences in the properties and geometries of the solids within each class. Key common and inherent characteristics of polymeric composites include: 1) the composites are all heterogeneous and most are anisotropic; 2) the composites generally exhibit considerable variability in their properties compared to metals; this variability is directly related to the volume of the respective fractions of the two phases, i.e., the primary liquid phase versus the primary solid phase; and 3) the composites follow a general "rule of mixtures," in which a property of the composite is equal to the sum of solid and resin matrix properties weighted by their respective volume fractions. The rule of mixtures, however, is not valid for most properties in fiber reinforced polymeric composites, except for longitudinal extensional modulus. In aggregate reinforced polymeric composites, the correlation of properties determined by the "rule of mixtures" is reasonably valid for, many properties and supports the art of solid filler additives, commonly used to enhance desired properties in the composite, and/or mitigate the effects of undesired properties.

Heterogeneity in a two-phase polymeric composite material refers to certain properties that vary from point-to-point throughout the mass of the material. In a random selection of a point inside the material, properties can be very different, depending on whether the chosen point falls in the polymeric matrix or in the solid component. While it is true that generally all composite materials are heterogeneous at the micron level, the degree of heterogeneity is generally more pronounced in fiber polymeric composites.

Additionally, the heterogeneity of these materials contributes to the significant variability of properties of thermosetting polymeric composites. In the case of FRPs, properties depend on the combination of several factors, such as the properties of the constituents, the form of the fiber reinforcement used (continuous fibers, woven fibers, chopped fibers, etc.), fiber volume fraction, length, distribution and orientation, bond strength between the phases, and void content. For example, strength and hardness characteristics of FRPs with continuous length fibers depend strongly on fiber orientation, spatial distribution and the variability of the properties of the specific fiber chosen. As it is impossible to position each fiber individually in the mix, the variability of the properties of the material is inevitable. The variability of composites reinforced with discontinuous fibers, such as bulk molding compounds (BMC) and sheet molding compounds (SMC) which are ultimately shape-molded and cured in closed dies, is even more enhanced due to the difficulty in controlling local uniformity of fiber content and orientation in the face of material flow. Accordingly, material hardness and strength in the finished fiber reinforced composites made of BMC or SMC may vary considerably from point-to-point throughout the material.

Anisotropy is another characteristic common to thermosetting polymeric composites, and is generally more pronounced in fiber polymeric composites than in aggregate polymeric composites. An anisotropic material is one whose properties vary with direction. In the case of FRPs with straight, parallel and continuous fibers, the strength of the material is significantly stronger and stiffer in the direction parallel to the fibers than in the transverse direction.

Reinforcing fibers used in fiber polymeric composites are man-made in continuous processes yielding fine filaments that are quite brittle, and generally consisting of diameters ranging from 2 to 13 microns. Filaments are normally in bundles of several strands as rovings or woven into fabrics. Glass fibers are the oldest, cheapest and most widely used. They have generally good chemical resistance, are noncombustible and do not adsorb water, although generally they adsorb humidity from air in atmospheric conditions. Their tensile strength-to-weight ratios are relatively high, with elastic moduli in the range of those of aluminum alloys. The internal structure of glass fibers is amorphous, i.e., noncrystaline, and are generally considered isotropic.

Reinforcing aggregates used in aggregate polymeric composites are natural occurring inorganic materials that require processing to remove undesirable contaminants, such as clays, iron oxides, etc. This processing involves mechanically sieving the granules, separating them by sizes, and drying them within 0.1% humidity by weight to assure compatibility with the resin systems. Humidity strongly affects interfacial bonding of the resin with a dramatic drop in compression and flexure strengths. Geological origin, impurity levels, particle size distribution, and particle shape all affect uniformity and homogeneity of dispersion of the aggregates in the liquid resin system. These factors influence, in turn, interfacial bond strength and void content. For high corrosion resistance, thoroughly washed and dried, high silica content aggregates are generally used. Rounded, spherical-shape aggregates generally provide better mechanical and physical properties than crushed, angular-edged aggregates, and also yield higher packing aggregate fractions with reduced void content and reduced resin fraction volume.

C. Voids in Polymeric Compounds and Composites

Voids are a major factor significantly contributing to property variation within a polymeric composite. Voids tend to reduce the integrity of the material and its mechanical and dielectric strengths, cause optical defects and lower the chemical resistance.

Any open space or volume in the surface of solid matter, or the interstices of fractured packed solids, exposed to atmosphere are subject to atmospheric air pressure, which will instantaneously fill these spaces with air. For example, when solid silica is fragmented and packed, as in the case of silica aggregates for polymeric concretes, or when filaments of molten silica glass are packed together to form glass fiber, as in the case of fiberglass, the mass of the fragmented packed aggregates or packed filaments exhibit an "apparent or bulk density" which is significantly lower than the respective unfragmented or unfilamented specific density of the respective original solid materials. For example, silica has a specific density of 2.65 g/cm$^3$ whereas the same silica fragmented into small diameter particles, approximately from say 100 microns up to say 6 mm, has a "bulk" density of only 1.6 g/cm$^3$. This "bulk density" indicates that the silica particles of irregular geometries in contact with each other, as when packed in a heap, leave random dimensional interstices or spaces—voids that are filled with air. Neglecting the weight of air, the sum of voids in one cubic centimeter of particulated silica is equivalent to the volume occupied by 1.05 grams of solid silica; that is, 39.6% of the fragmented silica volume corresponds to "air in the voids within the silica heap."

Since the formulations of polymeric composites are normally gravimetric, or by weight of bulk solids and liquid fractions, and furthermore, since the entrapped air is of negligible weight, its presence is not recognized gravimetrically. However, as detailed above, the properties of polymeric composites are related primarily to volumes of the constituent solid and liquid phase fractions, which, of course, include whatever volumes are actually occupied by air and water vapor entrapped in void spaces of fragmented or filamented solids. Moreover, the air, water vapor and other gases entrained in the voids of the solids add an important contribution to the total volume of the mixed compound material when the original solids are mixed with the liquid polymeric resin system. In fact, it is important to recognize that at the start of mixing of the two primary phase polymeric compound, actually three phases are present: (1) the original primary solid phase, (2) the original primary solidifiable liquid phase (e.g., a polymeric resin system), plus (3) a gaseous phase made up of the entrained air, water vapor and other gases in the primary solid phase, plus entrained air, water vapor and other gases that may be dispersed in the resin system. Moreover, interfacially active substances generally added in the resin manufacture stabilize air inclusions.

The presence of voids in a solid composite material interferes with its integrity because voids randomly interrupt the continuity, not only of the primary solidified liquid phase, but more importantly, also the continuity of the interfacial bond between the primary phases. Void sizes, number, distribution, and especially, locations are all critical because voids determine singular points of discontinuity within the phases of the material. These discontinuities compromise the composite's integrity, strength, and further, lead to the initiation of failures due to the localized stress concentration points they create. Moreover, if these voids in the mixed unsolidified state are filled with air and water vapor, $O_2$ in air will cause an inhibitory effect on the polymerization reaction of the resin. Water, particularly in liquid state, can be even more detrimental than $O_2$ to the polymerization reaction and to solidification. Thus, the removal of air, water vapor and other gases from the primary liquid resin system can result in more complete polymerization/solidification of the resin, thereby producing a material with greater strength and integrity.

For example, in fiber reinforced polymer composites, voids upset the rule of mixtures. Interlaminar shear strength should increase with increasing fiber volume fraction content. Instead, shear strength actually decreases, even at relatively low void contents. Experiments show that a 5% void content causes a 35 to 40% drop in interlaminar shear strength in a fiber/epoxy composite. (Delaware Composites Encyclopedia, Vol. 1, page 29, Technomics Publishing Co. 1989). In many fiber reinforced composite fabrication processes, void content tends to increase with decreasing resin content, i.e., with increased solid content. Again, it is notable that all strength properties of fiber reinforced polymer composites drop off at higher fiber volume fractions contents—generally above 50% fiber volume content, contrary to the expectations of the rule of mixtures. A particular study for E-glass/epoxy unidirectional composite made by filament winding shows a reduction of 30% of linear fiber stress strength at failure with an increase of fiber volume fraction from 60% to 70%. (Delaware Composites Encyclopedia, Vol. 1, page 66), Technomics Publishing Co., 1989). On a weight basis, typically a 60% glass fiber volume fraction is generally attained with machine processes and represents 78% of total weight of the composite. The highest reported glass fiber volume fraction content in non-machine processed composites in the industry, such as in RTM or SCRIMP, is generally about 70% by weight, which is equivalent to just 50% of fiber content by volume.

In the case of aggregate polymeric composites, however, strengths follow the rule of mixtures, and properties, particularly compression strength, actually increase with increasing aggregate volume fraction content (provided that the aggregate fraction's particle size distribution is suitably graded for highest aggregate volume packing). Moreover, this increase in mechanical properties is observed in spite of the increased void content accompanying the increased aggregate volume fraction. In this case, the increased number of gas occlusions producing voids can be offset by mechanical vibration and vacuum of the mix, resulting in a somewhat degassed mix. Notwithstanding this fact, random voids remaining in aggregate polymeric composites also constitute points of stress concentration which are detrimental to mechanical strength properties of the material and contribute significantly to the variability of properties exhibited by the final composite materials.

E. Degassing devices

The present state of the art attempts to deal with the removal of the entrained gaseous phase after the mixing the two primary phases. To deal with gas occlusions, conventional fabrication processes of polymeric composites generally require that the viscous compound mix, with or without special air release additives, be degassed under vacuum and/or pressurized and, in some cases, also mechanically agitated, vibrated, compacted, or combinations thereof. The application of these process steps enables movement of the gaseous phase within the viscous liquid mix assisting it to migrate towards the external surfaces of the liquid mass, escaping outside into the surrounding space. The freed gases then can be extracted by vacuum. Essentially, in the prior art, the gaseous phase is brought into the mixture entrained by the solids and/or by the liquid resin system and gets dispersed into the mixed unsolidified state. Therefore, in order to allow complete wet-out of the solids by the liquid resin system, some mechanism for removal of the gaseous phase is required. This is generally accomplished by degassing thin films of the mix under vacuum, which allows the occluded gas bubbles within the thin section to move towards its external surface. Moreover, these external surfaces are maintained at a lower pressure than the thin mass itself, thus facilitating evacuation by vacuum.

Present state of the art phase-mixing processes used to process polymeric composites, however, are not designed, nor intended, to eliminate entrained air, water vapor and other gases in the solids and liquid phases prior to the mixing process. Generally, the prior art methods of degassing are designed to work with the untreated primary phases already in the mixed state. Evacuation of gases from the mix is not only more inefficient and difficult but also less effective. Moreover, the mix can only be partially evacuated through mechanical and vacuum methods. Thus, the presence of voids in the final composite is inevitable using prior art methods.

For example, application of vacuum in a fiber polymeric composite made in a typical RTM or SCRIMP process does diminish entrapped air within the closed mold, or system, and from the glass fiber materials. Also gas vapors from the constituents of the resin system or from entrained air can be diminished by the application of vacuum, as evidenced by the reduction of visible occlusions in the solidified two-phase material. Likewise, vacuum applied to the thin sections of aggregate polymeric compounds in mixed state, especially in conjunction with mechanical vibration, which allows entrained air to be dislodged, and with air release additives that reduce interfacial tension, diminishes the total entrapped air and gases, and consequently, substantially diminishes occlusions/voids in the solidified two-phase material.

In particular cases, such as aggregate polymeric compounds involving resin/small diameter particulate microfiller mixtures, degassing a thin film of this mix with high vacuum, as described in U.S. Pat. No. 5,534,047, results in substantial elimination of gases from the mix and accordingly, a substantially "void free" composite is obtained. The success of this method is largely due to the microsize range of the filler in the primary solid phase and to relatively high resin matrix fraction volume of low viscosity, which allow good homogeneous dispersion of the solids in the liquid resin matrix. In this case, the primary solidifiable liquid phase resembles a low viscosity liquid, and therefore, behaves more like a pure liquid system. However, degassing by thin film vacuum as suggested in U.S. Pat. No. 5,534,047, is limited to a narrow range of applications. These applications involve either low viscosity liquids or low or moderate viscosity solid/liquid mixes that are capable of uniform gravity flow as thin films over flat surfaces, and that allow for relatively unimpeded movement of entrained gas occlusions by pressure differential through the viscous liquid film. Generally, however, in the prior art, two primary phase polymeric compounds are known to be incapable of being completely degassed by conventional methods including high vacuum.

F. Conclusion

Overall then, it appears that conventional processes as practiced in the present art of producing polymeric compounds cannot completely eliminate gas occlusions and voids from the compounds, and accordingly, from the corresponding solidified composites thus obtained from them. Polymeric composites produced in the prior art, therefore exhibit, high variability as well as decreased mechanical and physical properties as compared with the expected capabilities and performance of final composites produced ideally void free Moreover, the apparent acceptance in the composites industry of the presence of voids as unavoidable in the production of polymeric composite materials has precluded their potential cost effective penetration into new more technically demanding applications.

Polymeric resin system materials cost is one of the major factors affecting overall composite costs. Efforts to decrease resin system cost for increased composites competitiveness in market penetration have been generally frustrated because associated increases in solid content generally worsen rather than improve mechanical, physical and chemical properties, while significantly increasing production difficulty.

Thus, there exists a need to produce polymeric composites-both in fiber and aggregate classes-meeting a stricter and more rigorous criterion regarding freedom from gas occlusions and voids. If void-free, two-phase solid polymeric composite materials can be readily produced, they will at least exhibit increased mechanical, chemical resistance and physical strength, decreased variability of properties and enhanced reliability and performance. Polymeric composites in such a void-free solid state condition would both lower costs and improve quality in existing applications and thus, enable cost effective access to new, more demanding applications.

SUMMARY OF THE INVENTION

The present invention comprises a method for producing at least a two primary phase compound that is substantially free of air and other gases by separately treating the solid primary phase and the liquid primary phase prior to bringing the two phases into contact. Treatment of the two phases entails washing the primary solid phase with a condensable gas, so as to substantially remove and replace the solid phase's void contents; and separately degassing the primary solidifiable liquid phase by conventional means. Once treated, the primary solid phase (whose voids are substantially filled with the condensable gas) and the primary solidifiable liquid phase, are combined in a mixing step, and the condensable gas is condensed or liquefied in the mixed state. The resulting void-free, solidifiable compound thus comprises at least a solid phase and a solidifiable liquid phase. The solid primary phase may consist of either particulate or fibrous materials or combinations of both. The primary solidifiable liquid phase may consist of a thermoplastic polymeric resin system, a thermosetting polymeric resin system, a combination of both systems, or an inorganic binding system. Further, both the washing and mixing steps may be carried out in a batch or continuous mode, or in a combination batch-continuous mode. Additionally, the two primary phase solidifiable compound having a gas phase composed substantially of the condensable gas may be stored for later use.

The present invention also includes two primary phase solidifiable compounds made in accordance with the inventive method, as well as substantially void free polymeric composites formed from the solidifiable compounds. Note, the condensable gas that is used to wash the primary solid phase in the inventive method, may be condensed prior to or at solidification of the two phase compound, and may be partially or completely condensed in the mixed state. Void-free composites made from the inventive method are especially useful as electrical insulators.

The present invention also includes an apparatus for continuous production of the substantially void-free, two primary phase solidifiable compound. The apparatus is comprised of an enclosed container for the primary solid phase, and a means for producing vacuum within the enclosed container; a mixing device that is in communication with the enclosed container, and that is used both to combine the separately treated primary solid phase and the primary solidifiable liquid phase, and at least partially, to condense the condensable gas. The apparatus also comprises a condensable gas inlet in the initial region of the mixing device, so that the condensable gas flows continuously within the enclosed container in a direction counter to the flow of the primary solid phase; and a primary solidifiable liquid phase inlet located downstream of the condensable gas inlet within the mixing device. Finally, the apparatus contains a port for discharging the mixed, and substantially air-free, solidifiable compound. Optionally, the discharge port may consist of an airtight, expandable spout that allows for intermittent discharge of discrete amounts of the air-free compound while the mixing device continues to run.

Additionally, the invention includes an apparatus for batch production of a two primary phase solidifiable compound that is substantially free of air and other gases and voids. The apparatus is comprised of a closed revolving chamber for containing and mixing the primary solid phase, the primary solidifiable liquid phase, and the condensable gas phase; a means for applying vacuum and pressure within the chamber; one or more ports for discharging the chamber contents; and fixed or detachable molds that are attached to the discharge ports and are used to form the solidified composite. In addition to rotation about its longitudinal axis, the apparatus may also rotate about a transverse axis to aid in material handling.

Finally, the invention encompasses an apparatus for batch production of a substantially void-free solidifiable polymer concrete material. The apparatus is comprised of an enclosed mixing chamber, an enclosed molding chamber, and an enclosed conduit that provides for communication of the mixing chamber with the molding chamber. Moreover, the apparatus can be rotated in a vertical plane about an axis perpendicular to the longitudinal axis of the apparatus. This allows the contents of the mixing chamber to flow by gravity into the molding chamber. The apparatus may also provide a means for rotation about its longitudinal axis to mix the polymer concrete components. The apparatus may also contain a material holding hopper that can be interchanged with the molding chamber. This hopper is equipped with an intermittent dispensing device that provides for discharge of discrete and metered amounts of the solidifiable polymer concrete material.

DETAILED DESCRIPTION OF THE PREFERRED EMBODIMENTS

The present invention relates to methods, materials and apparatus used to produce a variety of void-free materials. These void-free materials, and the methods and apparatus for producing same are also detailed herein. The generic void-free method can be used to produce any two primary phase solidifiable compound and composite.

A key step in this inventive method is to replace the pre-existing entrained or entrapped gases with a selected "condensable gas" as defined herein. The "condensable gas" utilized in the present invention is defined herein as one or more substances that at normal ambient temperature and up to 50 atmosphere of absolute pressure, exists as a liquid. The purpose of the condensable gas in the invention is to displace and replace air, water vapor and other gases present within the voids and interstices of the primary solid phase. "Non-condensable gases" are defined herein as air, water vapor and other gases, which originally exist as gases filling the voids, and subsequently, are replaced by a selected condensable gas. Thus, a "non-condensable gas" is any gas other than the selected condensable gas used to replace the pre-existing gases, or displaced gases, in the system.

The present invention is an environmentally safe generic process of universal application to fabricate all types of two primary phase solidifiable compounds and composites, comprising a primary phase of reinforcing solid mixed with a primary of solidifiable liquid binder phase. It is applicable to the production of void-free polymeric composites in general. In particular, the method is applicable where the solidification mechanism of the primary solidifiable liquid phase involves solidification of its entire liquid phase. Additionally, the method is particularly applicable where thermosetting polymeric resin matrices are used as the primary solidifiable liquid phase.

Generic Method of Production

The generic method leading to void-free and gas occlusion compounds involves three essential stages in the production process. These stages are applicable to any method of production to yield a wide variety of compounds and composites.

The state of the two primary phases in the generic process are characterized in the invention at each of three successive generic processing stages:

Stage 1—Washing the primary solid phase with a condensable gas, in the gas or liquid state, and in parallel de-airing/degassing the primary solidifiable liquid phase.

Stage 2—Mixing the above two primary phases, air-free, and in presence of a condensable gas phase.

Stage 3—Condensing of the above condensable gas phase within the mixed state compound.

Application of the above method yields a two-primary phase, non-condensable gas occlusion free and void-free solidifiable mixed state compound, which can be cured immediately or stored uncured for future curing.

Figure 1:
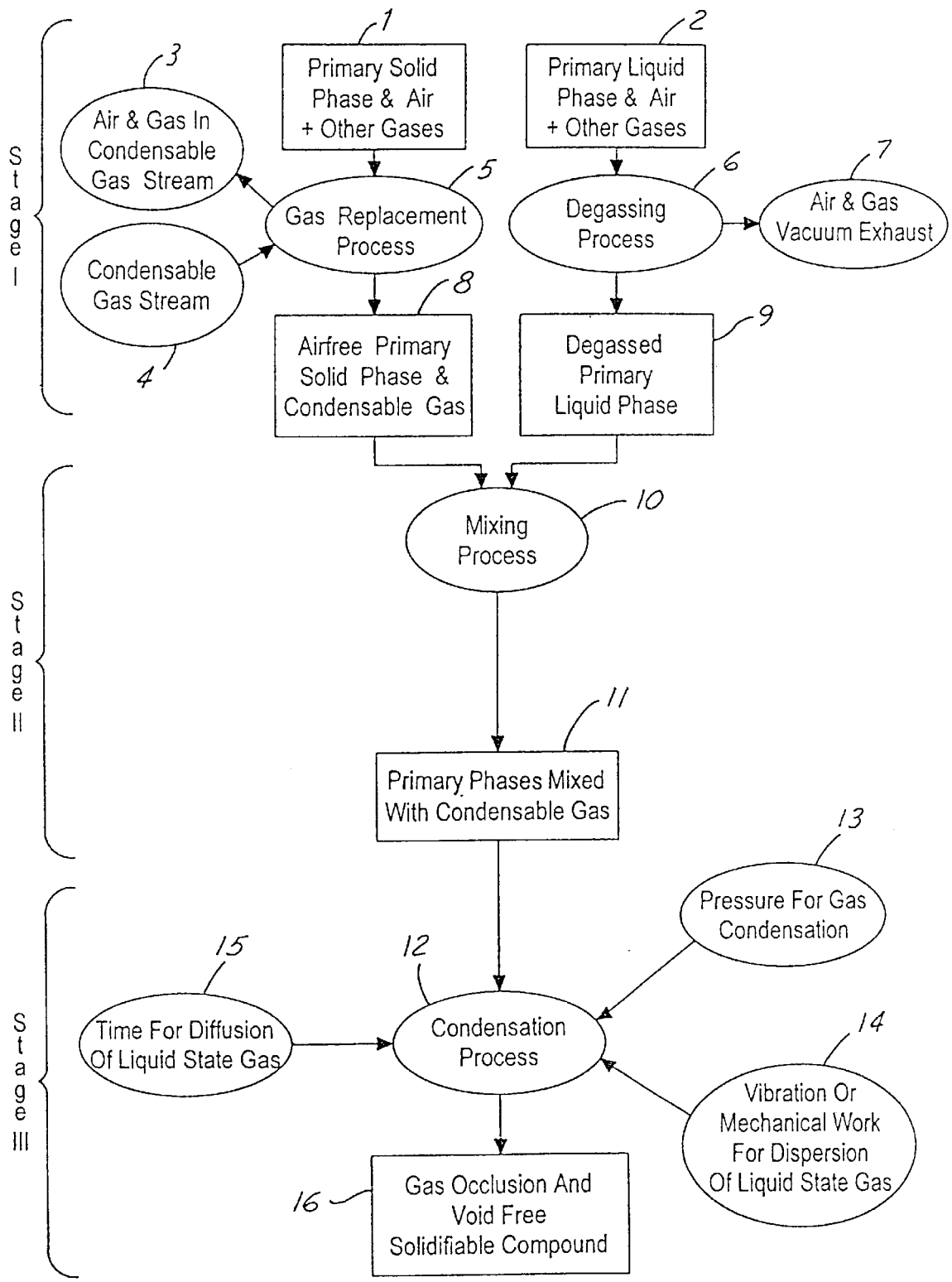
FIG. 1 is a schematic diagram illustrating the generic method of the present invention for processing a generic void-free, gas occlusion-free two primary phase solidifiable compound material.
Figure 2A:
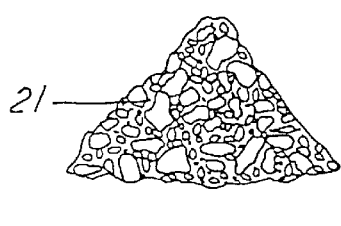
FIGS. 2A–E are illustrations of some of the forms of voids.
Figure 2B:
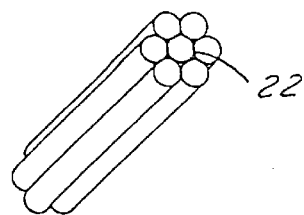
Figure 2C:
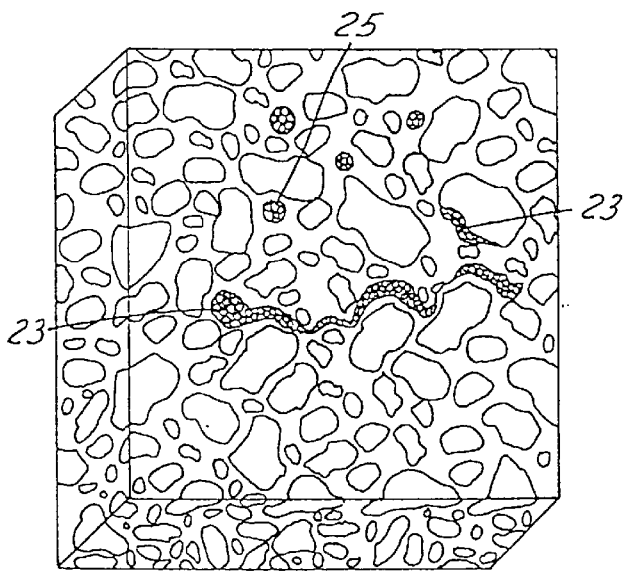
Figure 2D:
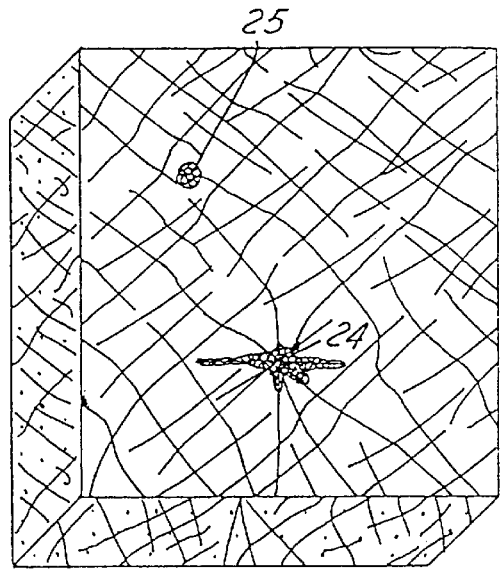
Figure 2E:
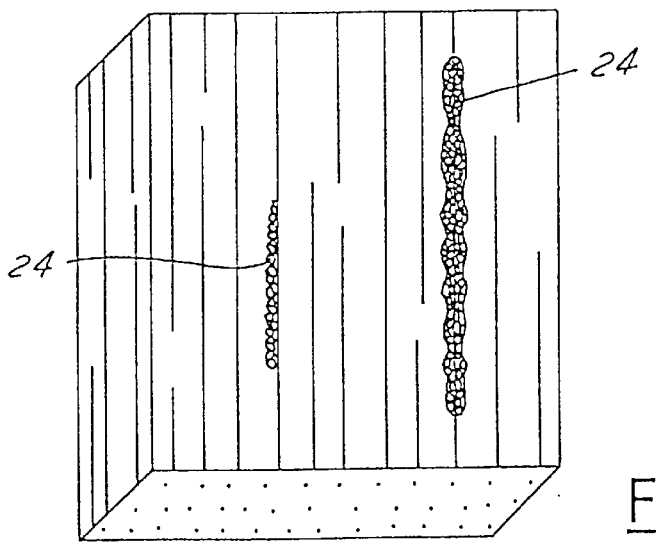

FIG. 1 shows a schematic of the generic process used to produce a generic non-condensable gas occlusion free and void-free two-primary phase solidifiable compound as disclosed in the present invention. The initial steps 1 and 2, consist of separating the primary solid and liquid phase for the purpose of independently removing air, water vapor and other gases entrained in each phase prior to mixing. As indicated, each primary phase contains entrained non-condensable gases, which in the case of the primary solid phase, are removed by the inventive method.

A. Stage I

An important step in the process is 5, shown in FIG. 1, where the primary phase solids are de-aired/degassed by total replacement with a condensable gas 4. This step 5 is significant to produce a non-condensable gas occlusion free and void-free compound because it permits the complete replacement of air/gases by washing the solids with a condensable gas chosen to adequately work within the parameters of conventional fabrication processes. The addition of this step to the overall void-free method recognizes the fact that it is essentially impossible to completely degas solids, or mixtures of solids and liquids, using conventional techniques with or without the application of vacuum. Thus, the present invention replaces air, water vapor and other non-condensable gases entrained in the solid with a condensable gas that can be liquefied within the mixed unsolidified state compound in the range of temperatures and pressures in which the production processes are carried out. Ideally, the condensable gas utilized, when liquified, would be reacted within the primary solidifiable liquid phase prior to, or at, solidification to form a solid void-free composite in a subsequent step.

As illustrated in 3, after washing the solids in a stream of condensable gas, the displaced air with associated water vapor and other gases can be removed by vacuum together with the stream of condensable gas. With the application of vacuum, at this point in step 5, the condensable gas in filling the voids in the solids as the air associated with water vapor and other gases are being removed, and the condensable gas is also simultaneously being fed into the primary solid phase, as seen in 4.

The condensable gas as a liquid state substance is vaporized to its gas state by some appropriate combination of pressure and temperature. The preferred vaporization conditions are at ambient temperature together with sufficient vacuum for vaporization. The preferred choice of a condensable gas is one that in its condensed liquid state would be capable of further reaction with the primary solidifiable liquid phase upon its solidification. There are essentially three classes of condensable gases disclosed in the present invention. Class I uses one or more liquid substances contained in, or forming part of, the solidifiable liquid system as sources of condensable gas to wash the primary solid phase. Class II uses one or more liquid substances, other than those forming part of the solidifiable liquid system, as a source of condensable gas to wash the primary solid phase. In the case of Class II, the liquid substances are functionally equivalent to those contained in Class I, in that Class II liquids are also capable of reacting in the solidification, or curing, process. Class III substances do not utilize a reactive or functionally equivalent fluid substance as a source of the condensable gas, but instead uses one or more fluids that are either soluble or insoluble in the solidifiable liquid system process conditions. Thus, for example, where the primary solidifiable liquid phase is an unsaturated polyester, styrene monomer would serve as a Class I condensable gas. Furthermore, other ethenic polymerization monomers could serve as Class II condensable gases, including, acrylamide, methyl acrylate, methyl methacrylate, vinyl acetate and the like. Finally, suitable Class III condensable gases would be organic solvents having normal boiling points between about 50° C. and 100° C., including acetone, methanol, ethanol, isopropanol, acetonitrile, and the like.

Preparation of the substance to be used as condensable gas in the invention can be done by methods generally known in the art, which include evaporation of the gasifiable liquid into a condensable gas with subsequent feeding of the gas thus produced into a gas replacement chamber 5. Preferably for continuous washing, evaporation of the gasifiable liquid may take place outside of the gas-replacement chamber, and then fed into the gas replacement chamber 5. Alternatively, preferably in the case of batch processes, evaporation of the condensable gas can take place within the gas replacement process chamber 5. In the case of Class I Liquid/gases, one or more of the liquid substances from within the solidifiable liquid system can be selectively evaporated from it and fed into the gas replacement process chamber 5. In still another alternative, evaporation into a condensable gas, using an appropriate temperature and pressure, can take place outside the gas replacement process and fed into it at elevated temperature, so that it is made to condense inside the gas replacement process chamber at process temperature and then subsequently re-evaporated within chamber 5 by a combination of pressure and temperature.

In parallel, the present invention requires that the primary liquid phase 2 be degassed by conventional vacuum methods, preferably thin film vacuum methods. This step allows removal of the entrapped air, water vapor or other gases within this primary phase. The de-airing/degassing of the primary liquid phase takes place in a degasifying process chamber 6. Reference numeral 7 illustrates that the air, water vapor or other gases entrained in the primary liquid phase are removed by the application of thin film vacuum methods which are generally more effective.

B. Stage II

Reference numeral 8 and 9, shown in FIG. 1, represents that the two primary phases having been separately treated to remove entrained air, water vapor and other non-condensable gases, and now, being de-aired/degassed by conventional methods in the case of the liquid phase, and condensable gas-replaced by washing with condensable gas in the case of the primary solid phase, can proceed to be mixed to form a non-condensable gas free, void-free solidifiable compound. Reference numeral 10 represents the air-free mixing processes into which each pretreated primary phase is contacted to begin the mixing process of what is now a primary solid phase, a primary solidifiable liquid phase and a condensable gas system, to yield a mixed state non-condensable gas occlusion free and void-free solidifiable compound. The mixing step 10 must be conducted only in air-free conditions and with the presence of the condensable gas in the gaseous phase.

The condensable gas in the mixing chamber may or may not be uniformly dispersed in the solidifiable liquid phase. An optional step can be performed at this point to disperse the condensable gas more homogeneously within the solidifiable liquid phase. This optional step can be accomplished by applying vibration or mechanical work to the mixed state compound. Additionally, if elimination of excess condensable gas is desired, as it might in batch mixing process, vacuum and mechanical work can be applied at this point to achieve this end.

C. Stage III

The next step is significant to the overall void-free process and production of the non-condensable gas occlusion free and void-free compound to yield a final void-free composite material. This step involves condensation of the condensable gas preferably within a condensation chamber 12, as shown in FIG. 1. Later, at the time of forming and hardening of the compound, pressure and/or heat can be applied to form a final solid composite. This essential step 12 takes the condensable gas to its corresponding liquid state at process temperature by application of pressure 13, or by some appropriate combination of temperature and pressure. Upon condensation of the condensable gas throughout the mixed state solidifiable liquid system, all spaces in the mix previously occupied by the condensable gas, as a gaseous state substance, are available to be occupied by the solidifiable liquid system which does so assisted by its own pressure, so the mixture becomes a non-condensable gas occlusion free compound. Concurrent with this essential condensation step, the solidifiable compound may be vibrated or mechanically worked upon, as illustrated in 14, so that the condensed gas, now in liquid state, may be dispersed within the liquid phase of the mixture, thus allowing penetration of the liquid phase into interstices and voids on the surfaces of the solids. Alternatively, vibration need not be applied because the element of time can be used to allow for diffusion of the condensed gas liquid droplets within the liquid system as seem in 15. Reference numeral 16 represents the end product of the generic process, yielding a non-condensable gas occlusion free, and void-free, two primary phase solidifiable compound that can now be immediately hardened or stored for future solidification.

The effectiveness of the method and mixing conditions disclosed in the present invention, specifically, in terms of prior displacement of air, water vapor and other gases from voids in the dry solids by washing with a condensable gas and subsequent total replacement with a condensable gas, cannot be attained by present art vacuum only processes. The reason stems not only from the fact that perfect vacuum conditions cannot be achieved, so the entrained gases in the solids can only be rarefied at best, and moreover, because total dependence on high vacuum to maintain an air-free condition of the primary solid phase is unfeasible and impractical. It is perhaps for this latter reason that vacuum degassing pretreatment of the solids has not been considered in present art nor included in conventional processes.

As stated above, in contrast to the present invention, the typical prior art degassing processes shift all attempts of gas removal to the wet mixing stage of the two primary phases. In that case, the non-condensable gases naturally present in the mixing process become dispersed throughout the mixed state compound mass, making vacuum degassing at this stage ineffective and inefficient. Again in contrast to the present invention, the prior art procedure is considerably more difficult and less effective in high viscosity systems. In fact, in the prior art methods, gas phase removal becomes virtually impossible in cases where the resulting mixture viscosity of the mixed state of the solid and liquid phases is significantly increased by their addition.

Void-Free Considerations in Polymeric Compounds and Composites

It is somewhat surprising that current technical literature on voids does not delve into the causes or origins of voids in solid state polymeric composites, and no link has been established, or suggested, to identify their origin as gas occlusions already pre-existing in the original solidifiable—two phase mixed state compound. Voids in the compound are then transported into the solidified resin matrix of the composite. In developing the present invention, it has been discovered that the success of any air-gas phase removal strategy from the mass of a two primary phase mix containing a gaseous phase depends on the following:

ratios or surface tensions existing between the gaseous, liquid and solid phase present in the mix;

average size of the air and gas occlusions;

pressure differentials that can be established between those within the different gas occlusions, and that of the external surface of the mass maintained at a lower pressure;

viscosity and rheology of the liquid state mixture;

geometry of the specific masses;

length of the paths the occlusion gas bubbles need to move to access the lower pressure external surfaces;

obstacles intercepting the paths of the occluded gas bubbles;

ability of mechanical vibration applied to the mass to pack the solids within the liquid for displacing gas occlusions;

time that the vacuum originating the pressure differential is maintained;

Given that we are surrounded by air and atmospheric pressure, the natural state of voids in open atmosphere is to be filled with air, water vapor and other gases as defined herein. Ideally, upon mixing the two primary phases into the unsolidified, multiphase, mixed state, voids in the primary solid phase and in the mixed unsolidified state should be completely occupied by the solidifiable liquid phase. The occupation, however, is generally precluded by the counter pressures exerted by the gases in gaseous state filling the voids. Therefore, this gaseous phase filling voids will be retained in the mixed, unsolidified state. Moreover, if no effort is made for their elimination, the gas occlusions will remain in the mixed state solidifiable compound, and thus, will irremediably appear as voids in the final solid composite.

In the final solid composite, voids or unfilled spaces within the solidified liquid phase may be generated by one or more constituents materials of the mixed state gas occlusion free solidifiable compound, or during subsequent storage, handling and processing. Such voids in the solidified composite are not caused by non-condensable gas filled voids or unfilled resin voids pre-existing in the mixed state gas occlusion free solidifiable compound, and thus the invention remains valid.

In the invention, the primary solidifiable liquid phase is a polymeric resin system generally exhibiting typical viscosities at normal process temperatures. These viscosities determine a behavior of the gaseous phase that require further description. Gaseous phase occlusions are suspended in the polymeric resin system occurring naturally as discrete spherical volumes maintained by a pressure and surface tension equilibrium that is established between the liquid and gas phases. Also, gaseous phase occlusions may occur as amorphous thin layer gas filled voids of large surface to volume ratio, lodged in the interstices within fibers or formed around closely packed aggregates in the primary solid phase upon mixing with the polymer resin system, particularly in compounds having high volume fraction of solids.

In the mixed unsolidified state, the voids in the primary solid phase may release some of the entrained gaseous phase into the primary liquid phase, where it may join other entrained gases found in the primary liquid phase. Mechanical work applied to the mixed state of the two primary phases containing entrained third gaseous phase will generally help the release of the gaseous phase lodged in voids of the primary solid phase into the primary liquid phase and also help disperse the gaseous phase within the liquid phase. Mechanical dispersion of the gaseous phase can also increase the surface to volume ratio of the gas occlusions. Some gas occlusions get broken down into smaller spherical sizes, while others may adopt other than spherical shapes, generally of high surface relative to their initial volume, such as the amorphous thin layers voids described above. Gases filling these amorphous, thin layer voids are completely entrapped in the interstices within fibers or within packed fibers or aggregates by the surrounding primary liquid phase, forming localized and enclosed micro-gaseous phase systems separating the two primary phases in mixed state at discrete locations. Moreover, the volumes of localized, enclosed micro-gaseous phase systems will be determined by a, pressure equilibrium existing between the gaseous phase systems internal pressure and the surrounding liquid phase at a given process temperature. This pressure barrier prevents the surrounding liquid phase from wetting out the interstices of the solids where the micro-gaseous systems are lodged.

As indicated above, voids can take several typical forms within the primary phase materials. FIG. 2 provides an illustration of some typical void forms in solid primary phases, prior to mixing. Voids can be viewed as spaces between the interstices of packed solids of a primary phase, prior to mixing, as shown in 21 in aggregates, and as shown in 22 in fibers. The amorphous, high surface to volume voids, in the form of thin layers of gas adsorbed on the surface of solid in the mixed state are shown in 23 in an aggregate/resin system, and in 24 in a unidirectional and random oriented fiber/resin systems. Reference numeral 25 illustrates the typical natural spherical gas bubble shape upon mixing of the primary phases. The above characterized voids shown in 23, 24 and 25 are formed typically in the mixed state and will be retained in the final composite material upon solidification, if no effort is made for their removal.

The significant deleterious effect of even low void content, with their associated air, water vapor and other non-condensable gases, in fiber reinforced polymeric compounds in the mixed state and carried over to the solid composite state are not generally fully recognized. Voids remain one of the major unrecognized source of problems fiber reinforced organic polymeric composites face today. Specifically, amorphous thin gas layers randomly located constitute a barrier intercepting contact of the fiber and liquid phases, and thus significantly affect proper resin wet out. More particularly, this barrier discretely interrupts the continuity of interfacial bonding. For an illustration, consider a typical 9 micron fiber diameter fiber reinforced polymeric composite with a 1% void content by volume—a void level which is generally considered acceptable by industrial quality standards. The effect of that 1% void content, if present as random thin gaseous layers of sub micron thickness on the fiber surfaces, as would be typical in fiber reinforced composites manufactured through mechanical work, could be interpreted as being equivalent to compromising, or nullifying, the overall contribution to tensile strength at failure of approximately 5 to 7% of the fiber volume fraction present in the composite.

If no mechanical work is involved in the production of the fiber reinforced compound, such as in RTM or SCRIMP, it is reasonable to expect that more voids will be as gas occlusions randomly suspended in the resin of the liquid phase, which generally do not affect fiber wet out and interfacial bonding as much as gas layers lodged within or around the fibers. Moreover, also in this case resin volume fractions are generally higher, and the overall fiber contribution nullified by voids would tend to be less dramatic. However, there is a practical fiber volume fraction limit in non-machine processed products in industry today, at around 50% by volume. This is imposed not only by the generally practical difficulty of achieving higher fiber volume fraction packings, but also by the effects of voids at high fiber volume fractions, forming amorphous thin layer gaseous random entrapments of very high surface to volume ratios in the interstices of the highly packed fiber arrangements. The counter pressures of such voids prevent resin wet out of longitudinal contact surfaces of the fibers and within fiber interstices. These gas occlusions cannot be removed by the normal vacuum levels of RTM or SCRIMP processes, so attempts to increase fiber volume fraction in these types of fiber reinforced polymeric composites, unless voids are first eliminated as per the invention, would not be productive.

The application of the general rule of mixtures to fiber reinforced composites for longitudinal and transverse extensional moduli suggests a linear increase of moduli with increasing fiber volume fraction. However, as pointed out above, this is not evidenced at high fiber volume fractions beyond 50%, where material properties in fact actually decrease. Presumably, such anomalies could be attributed to the deleterious effects of voids in the fibers preventing proper fiber wet out and overall interfacial bonding which is additionally severely affected by reduced levels of available resin matrix content in high fiber volume fraction compounds.

Therefore, unless void are first completely eliminated from the mixed state compound, making accessible to the liquid resin all available fiber contact surfaces, which will be otherwise partially blocked by the voids, any increments of fiber volume fraction will generally have the equivalent effect of nullifying several times more fibers than are added.

It is impossible to control or predict with any accuracy the forms or locations of entrained air, water vapor and other gases from the primary phases forming voids in the mixed state of a two phase polymeric compound. A wise strategy to improve maximum wet out of the phases and obtain optimal interfacial bonding of the surfaces of the total fiber available with resin is, prior to mixing, to eliminate air/water vapor gases completely from the fibers, and likewise, to completely degas the liquid resin phase and eliminate its entrained air and other gases. Moreover, the adoption of a rigorous elimination of voids in the production of fiber reinforced polymer composites, particularly at higher fiber volume contents, will facilitate increasing composite strength with increasing fiber volume content, and thus approximate the composite behavior to that expected by the rule of mixtures. An important corollary of this is that at high fiber volume contents and diminished resin volume contents, the ratio of fiber contact surface to available resin volume increases and interfacial boding becomes critical. In this case, overall strength appears foremost related to actually achieving maximum successfully bonded surface adhesions between the two primary phases rather than to the particular resin strength properties themselves.

The present invention allows reaching a substantially void-free condition. A non-condensable gas occlusion-free and void-free material is defined as a two primary phase solidifiable polymer compound when in substantially the liquid state, and as a void-free composite when in the solid state. Polymer composites made in accordance with present invention exhibit no gas occlusion voids, in the size range of one micron visually detected under 1250× magnification in any random cross-section sample of at least 400 mm. It is significant to point out that just one void of one micron diameter in a 1 $mm^2$ area represents less than 1 part per million.

In the case of fiber polymeric composites, if voids were to occur in diameter sizes below the above visual count level, given their relative size and dispersion with respect to known fiber diameter of 2 to 13 microns, in the prior art, voids could still affect fiber wet out by the resin, if they are very numerous and in the form of very thin gas layers. Such voids would still significantly interrupt interfacial boding, and thus, affect mechanical properties. Notwithstanding, a method capable of achieving void freeness could still be expected to generally increase significantly the longitudinal and transverse elongation moduli and associated strengths, and particularly transverse strength properties.

Likewise, in the case of aggregate polymeric composites, void-free polymer concrete composites made with the formulation of one of the examples in the invention, do not exhibit oscilloscopically discernible partial discharges in prototype insulators when subjected to high voltages, at least below 90–100 KV, while only very modest partial discharges would be seen starting above this range. Optimized aggregate and resin formulations of dielectric polymer concrete composites, on the other hand, can significantly increase the above-threshold of partial discharge initiation and the overall dielectric strength of void-free aggregate polymeric composites.

In conclusion, using this new understanding of voids and their sources, a generic inventive method yielding a void-free and occlusion free composite material was derived.

Application of the Generic Method to Fabrication Processes

The generic method of the invention for producing two primary phase void-free/gas occlusion free unsolidified compounds can be applied to specific present art fabrication processes. In particular, the generic method can be most effective in the manufacture of thermosetting polymeric compounds and composites where the primary solid phase materials, (are either packed fibers in fiber reinforced polymer composites or granular aggregates in aggregate reinforced polymer composites). Such composites and compounds generally exhibit low bulk densities indicating large amounts of entrained air and other gases in the solids.

Tables 1 and 2, and the accompanying legend, further illustrate how the generic method can be applied to produce two primary phase, thermosetting polymeric compounds and composites, combining the void free method with conventional mixing and forming processes (batch mixing, continuous mixing or combinations of both). As further shown in Tables 1 and 2, the void free method can be used to fabricate a vast array of thermosetting polymeric composites where the reinforcing solids in the primary solid phase can be either fiber or aggregates, or a combination of both, and where the primary liquid phase can be any thermosetting polymer resin system and monomer, either extended or not with filler solid materials intended to modify the properties of the binding resin matrices.

A. Batch Mixing and Batch Forming Processes

As illustrated in table 1, the generic method can be used in batch mixing and forming processes. Moreover, using the inventive method, these batch fabrication processes can be used to produce an array of void-free and gas occlusion free compounds and composites. The choice of matrix reinforcement for the batch processes can be selected from either the fiber or aggregate class of solids. The legend, seen below, gives an explanation for each of the numbers contained in Table 1.

TABLE 1

BATCH MIXING AND BATCH FORMING PROCESSES
PROCESS STAGES & CHARACTERIZATIONS OF TYPICAL THERMOSETTING
POLYMERIC COMPOUNDS AND COMPOSITES WITHIN RANGE OF PATENT

PROCESSES
TWO PHASE BATCH MIXING
BATCH FORMING
MIXING TYPE

| | IN MOLD MIX AND FORM | MIXER TO STORAGE TO MOLD | | MIXER TO MOLD |
|---|---|---|---|---|
| | MATRIX REINFORCEMENT | | | |
| | FIBER | FIBER | AGGREGATE | AGGREGATE |
| | GENERIC PRODUCTS | | | |
| STAGES | FRP/RTM | BMC | PC | PC |
| STAGE I — Washing primary Solid Phase with Condensable Gas. (Primary Liquid Phase degassed by conventional methods.) | 1.1. and 1.2 | 1.1. and 1.2 | 1.1. and 1.2 | 1.1. and 1.2 |
| STAGE II — Air free Mixing of two Primary Phases in presence of condensable gas only | 2.2 | 2.5 | 2.1 | 2.1 |
| STAGE III — Condensation of Condensable Gas. | 3.3 | 3.2 | 3.1 and 3.4 | 3.1 |
| STAGE IV — Uncured compound storage | N/A | 4.1 | 4.1 | N/A |
| STAGE V — Composite final forming and curing | 5.1 | 5.1 and 5.2 | 5.1 and 5.2 | 5.1 |

LEGEND TO TABLES 1 AND 2

Process Stages and Characterization of Typical Thermosetting Polymeric Compounds and Composites Within Range of Patent Stage 1 De-airing of the two primary phases prior to their mixing
Process 1.1. Replace air in solids by washing with a condensable gas
Process 1.2 Conventional thin film vacuum de-airing of liquid resin system
Characterization at Stage 1-Voids inside solids are occupied only by condensable gas and solid mass is soaked in a condensable gas medium. Liquid resin system is air free.
Stage 2 Air-free mixing of the primary phases in presence of condensable gas phase only
Process 2.1 Mechanical agitation in mixing device
Process 2.2 Pressurized injection of liquid resin system into solids
Process 2.3 Combination of Process 2.1 and 2.2
Process 2.4 Continuous immersion of solids in liquid resin system tank
Process 2.5 Mechanical kneading in mixing device
Process 2.6 Mechanical pressure kneading in SMC machine
Characterization at Stage 2-Unsolidified, two-primary phase mixed state compound having dispersed occlusion bubbles of condensable gas only.
Stage 3 Condensation of condensable gas, dispersion and diffusion of condensed gas
Process 3.1 Mechanical vibration under vacuum and condensable gas
Process 3.2 Mechanical pressure
Process 3.3 Hydraulic pressure on resin system
Process 3.4 Gas pressure
Characterization at Stage 3-Unsolidified two primary phase mixed state compound lacking voids and gas occlusions.

Stage 4 Unsolidified void-free compound storage (if applicable)
Process 4.1 Storage at below ambient temperature
Note: Storage conditions must maintain Stage 3 characterization.

Stage 5 Solid composite final forming and curing under absolute pressure at least equal to vapor pressure of condensable gas at specified maximum process temperatures
Process 5.1 External pressure applied to composite in mold
Process 5.2 Mechanical pressure and heat of forming dies
Process 5.3 Process' own pressure Final Characterization-Formed solid composite product free from air and gas occlusions, voids.

B. Continuous Processes

As illustrated in Table 2, the generic method can be used in continuous mixing processes. In this case, the forming protocol can be either batch or continuous. Moreover, using the inventive method, these continuous fabrication processes can be used to produce an array of void-free and occlusion free compounds and composites. The choice of matrix reinforcement for the batch processes can be selected from either the fiber or aggregate class of solids. The legend above gives an explanation for each of the numbers contained in Table 2.

TABLE 2

CONTINUOUS MIXING WITH BATCH AND CONTINUOUS
FORMING PROCESS STAGES & CHARACTERIZATIONS OF TYPICAL THERMOSETTING
POLYMERIC COMPOUNDS AND COMPOSITES WITHIN THE RANGE OF PATENT

PROCESSES
TWO PHASE CONTINUOUS MIXING

| | BATCH FORMING | | CONTINUOUS FORMING | | |
|---|---|---|---|---|---|
| | | | MIXING TYPE | | |
| | MIXER TO STORAGE TO MOLD | MIXER TO MOLD | IN LINE MIXING FORMING | | |
| | | | MATRIX REINFORCEMENT | | |
| | FIBER | AGGREGATE | AGGREGATE | CONTINUOUS FIBER | AGGREGATE |
| | | | GENERIC PRODUCTS | | |
| STAGES | SMC/TMC | PC | PC | PULTRUSION FRP | FILAMENT WIND FRP | CENTRUFUGAL PC |
| STAGE I — Washing primary Solid Phase with Condensable Gas. (Primary Liquid Phase degassed by conventional methods.) | 1.1. and 1.2 | 1.1. and 1.2 | 1.1. and 1.2 | 1.1. and 1.2 | 1.1. and 1.2 | 1.1. and 1.2 |
| STAGE II — Air free Mixing of two Primary Phases in presence of condensable gas only | 2.6 | 2.3 | 2.3 | 2.4 | 2.4 | 2.3 |
| STAGE III — Condensation of Condensable Gas. | 2.6 | 3.2 | 3.2 | 5.3 | 5.1 | 5.3 |
| STAGE IV — Uncured compound storage | 4.1 | 4.1 | N/A | N/A | N/A | N/A |
| STAGE V — Composite final forming and curing | 5.2 | 5.1 and 5.2 | 5.1 | 5.3 | 5.3 | 5.3 |

In fabricating polymeric thermosetting composites by the void free method, conventional pressure vessels adapted as needed, are used to maintain a pressure-controlled, air-free environment. Most preferably, a vacuum source should be used. In particular, in the three stages of the generic method, the pressure vessel must be connected to external pressure sources designed to operate at process temperatures in a pressure range from about 1.2 to 3 times the vapor pressure of the condensable gas selected. These pressures will generally be sufficient to force the liquid phase to fill the voids during stage III.

Application of the Generic Method to the Production of Compounds and Composites

Figure 3:
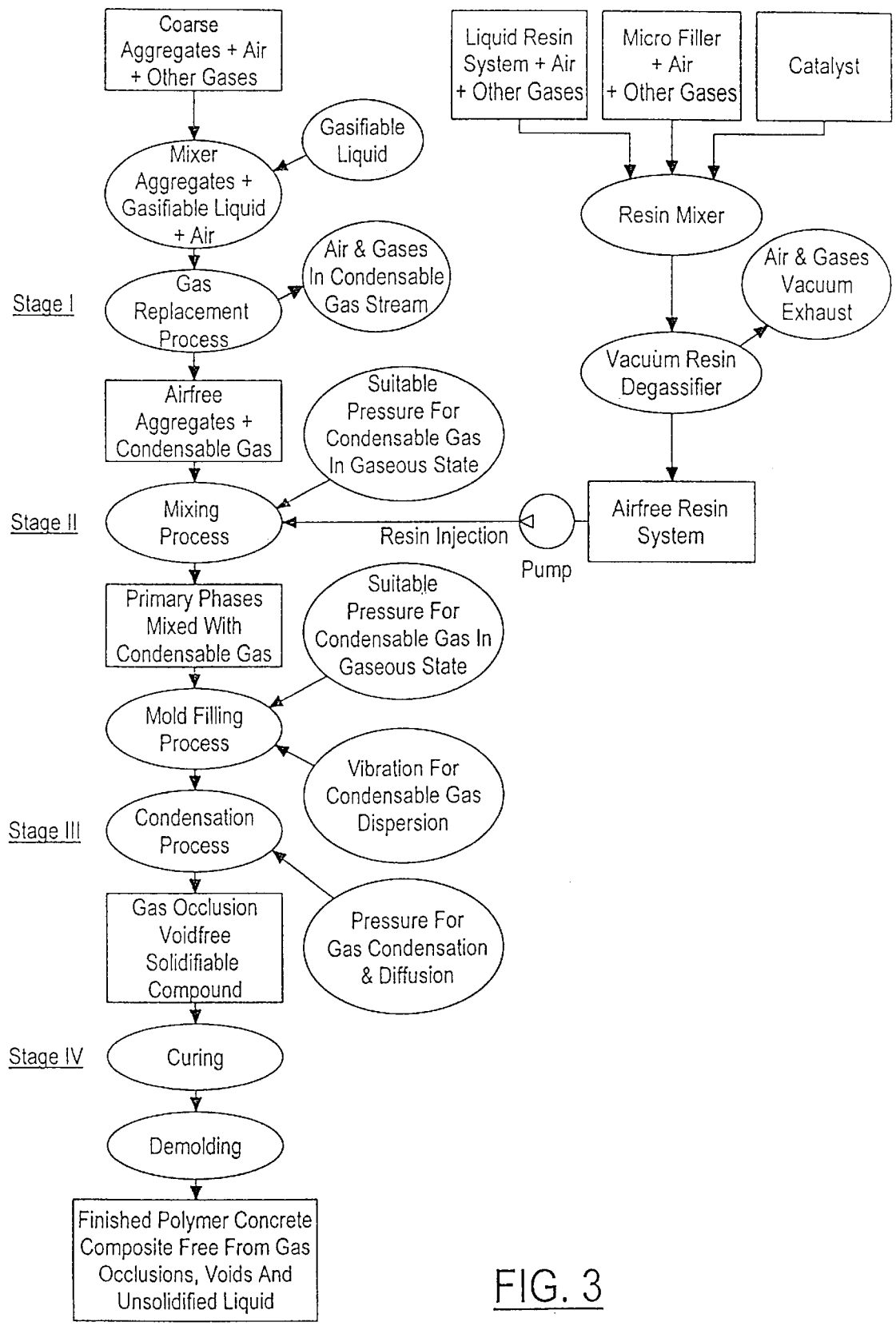
FIG. 3 is a schematic representation of another application of the present method in which a void-free polymer concrete composite material is produced by a batch mix and molding method.
Figure 4:
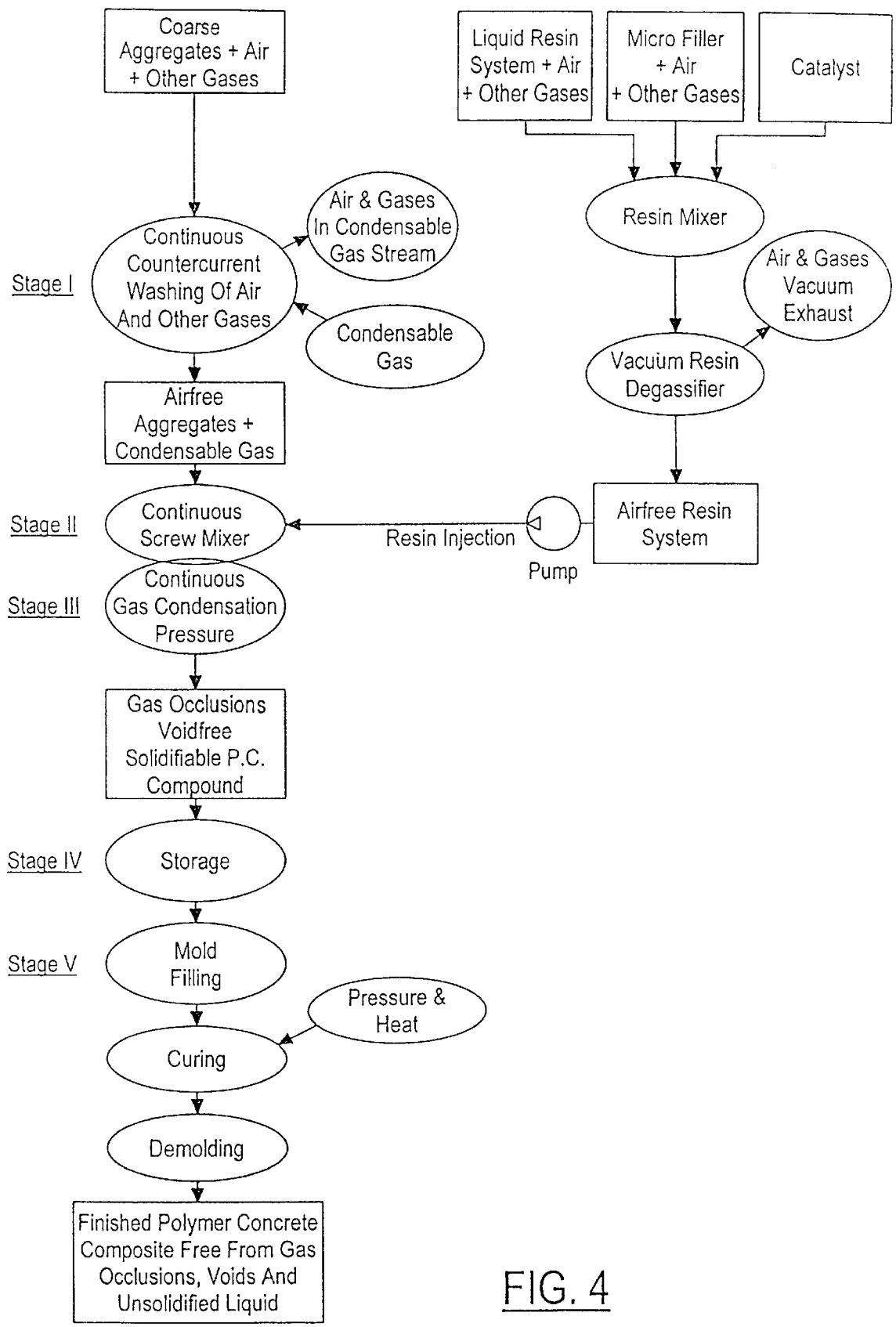
FIG. 4 is a schematic representation of yet another application of the present method in which a void-free polymer concrete compound is produced by a conventional continuous mixing method, and where a polymer concrete composite is produced by a mixer to storage to mold method.
Figure 5:
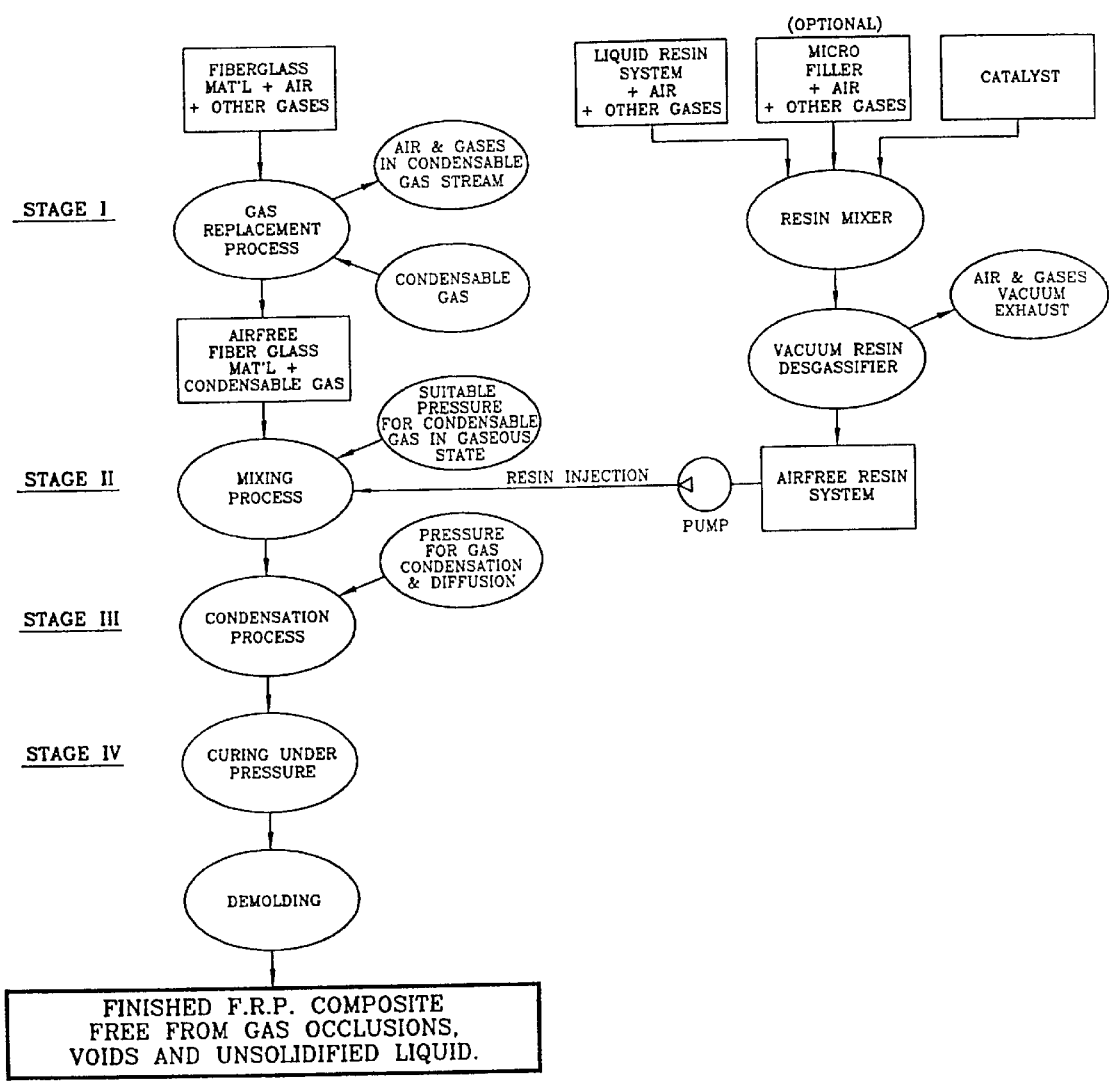
FIG. 5 is a schematic representation of still another application of the present method in which a void-free fiber reinforced polymer composite is produced by a Resin Transfer Molding (RTM) method.

The generic process of the invention for two primary phase, non-condensable gas occlusion free and void-free solidifiable compounds can be applied specifically to various technologies common in the field of polymeric composites. FIGS. 3–5 illustrate how both thermosetting polymer concrete composites and fiber reinforced thermosetting polymer composites can be produced from the generic method of the present invention with two additional successive processing stages that take the characterized non-condensable gas occlusion free and void-free compound to final void-free polymeric composite.

Detailed descriptions of preferred embodiments illustrating the application of the generic inventive method to the production of two-primary phase, void-free compounds and composites are shown in FIGS. 3–5. These figures are illustrations of the inventive generic method used to produce void-free polymeric composites by a variety of methods known in the art. FIGS. 3 and 4 are examples of void-free polymer concrete composites, and FIG. 5 is an example of a void-free fiber reinforced polymer composite produced by Resin Transfer Molding (RTM). Additionally, these figures show flow charts of specific fabrication methods applied in each of the successive three stages described in the inventive generic production method, followed by up to two additional successive stages required to yield the respective final void-free polymeric composites. The generic method is likewise applicable to paints and gel coats, which are used as barriers to protect the external surfaces of reinforced polymer composites and polymer concrete. Gel coats are polymeric compounds (solidifiable liquids) filled with thixotropic solids (pyrogenic or fumed silicas, for example) and are known in the industry to contain a significant amount of voids due to entrained air. Because these large and numerous voids are unsightly, gel coats are heavily pigmented to mask their presence.

A. Polymer Concrete Composites, Methods and Materials
  1. Batch Polymer Concrete Polymer concrete (PC) composite sample in FIG. 3 is made by batch processes in four successive stages to yield a non-condensable gas occlusion free and void-free solid polymer concrete material. The description of these stages is as follows per FIG. 3 and as specified in Table 3.

i. Stage I—Elimination of air water vapor and other gases from the primary solid phase in parallel with degassing of the primary solidifiable polymer liquid phase Using the present invention, the two primary phases are generally processed prior to their mixing, with each phase being degassed separately by a different method. These two degassed phases are then brought together and mixed under air free conditions. The key objectives in the method are: 1) to completely eliminate air with associated water vapor and traces of any other gases by displacing them, and, thereby, filling the voids of the primary solid phase materials with a condensable gas prior to mixing, and 2) in a separate process, to eliminate air and traces of other gases from the liquid resin system by degassing the liquid under high vacuum using conventional thin film methods prior to mixing. The two air free phases can then be mixed under air free conditions where the only gas present is the condensable gas used to wash the solid materials.

Air and associated water vapor and other gases which fill or are entrained in dry reinforcing materials, used in this batch mixing example, are eliminated by placing the solids inside a vessel connected to a vacuum source while using the apparatus illustrated in FIG. 6. Condensable gas in the liquid state at ambient temperature and atmospheric pressure is fed into the inclined vessel. The amount of condensable gas in the liquid state is dosed so that at least twice the void volume of the vessel and void volume in the packed aggregates will be occupied by the condensable gas upon its evaporation. Evaporation of the condensable gas in the liquid state is initiated by applying a vacuum to the closed vessel, preferably with the vessel and contents at rest, and with a stream of condensable gas rising from the bottom surface of the vessel upward through the packed solids to the upper vacuum port. This vacuum is pulled until the entire liquid content has evaporated and then the vacuum port is closed. The chosen condensable gas will thus have completely displaced and replaced the entrained air, water vapor, and other gases in the voids of the solids and in the free volume of the vessel. Optionally, the vessel can be heated externally in order to maintain the initial system temperature to compensate for the heat intake of the endothermic evaporation process of the condensable gas and also to ensure the condensable gas remains in gaseous state. The gas process conditions at the end of evaporation of the condensable gas must be maintained so that external air is prevented from contaminating the contents of solids soaked with condensable gas in gaseous state, and more importantly, to prevent reversion of the condensable gas replacement in the solids by external air. The degassified solidified liquid resin phase is then fed into the closed vessel to begin batch mixing with the solids soaked with condensable gas.

Air, water vapor, and other gases dispersed in the liquid thermosetting resin system are likewise also eliminated prior to mixing in a separate process by using any conventional, effective, thin film vacuum degassing process. As previously stated, the resin system is a second source of potentially large volumes of air and other gases that would be incorporated into the two primary phase mixed compound if, as in prior art, no step is performed to ensure their complete removal.

ii. Stage II—Air free mixing of the two air free primary phases

The two air-free phases are then mixed under air free conditions in the closed mixer at process temperature and a suitable condensable gas vaporization pressure. Here the only gas present is the condensable gas used previously to wash the solid materials. Moreover, mixing occurs in an atmosphere of the condensable gas. Thus, in the inventive process the mixing process of the two primary phases takes place in a medium where the third phase, i.e., the gas phase has been rendered free of air by condensable gas replacement per the invention.

When mixing is complete, the condition of the mixed state compound will be otherwise identical to that in prior art processes, except that in the invention the third phase consists of a condensable gas phase, instead of air, water vapor and other gases. Furthermore, the condensable gas is randomly dispersed throughout the viscous liquid phase by the mixing of the phases. At this point, the gas phase is in the form of discrete spheres or bubbles suspended in the liquid phase or entrapped in the interstices within the primary solid phase.

In this example of batch mixing and forming, the two primary phase polymeric compound, as shown in FIG. 6, is poured into the mold section of the vessel maintaining the mixing process conditions. To accomplish this, as illustrated in FIG. 6, the mold is attached to, and forming part of, the mixing chamber in the vessel, and by pivoting the assembly, the contents in the mixing chamber are gravity fed into the mold cavity. The accommodation of the two phase mixed compound in the mold is completed by mechanical vibration to pack the two phase mixed compound tightly to the shape of the mold, thus ensuring all corners are filled, and at the same time, dispersing the condensed gas droplets into the solidifiable liquid system.

iii. Stage III—Condensation of the condensable gas

With the two phase compound in the mixed state sufficiently packed into the mold, as shown above, the process pressure is made at least equal to, or preferably higher than the condensable gas vapor pressure at the process temperature. This enables the absolute pressure at any point within the mixed state compound mass to be at, or above, the condensable gas vapor pressure, thus ensuring all dispersed condensable gas bubbles will condense, and all voids thereby, will be filled with liquid resin. Under these conditions, the condensable gas phase is totally condensed. Sufficient time is allowed for the condensed gas in the liquid state to fill voids throughout the mixed state compound, yielding a void-free polymer concrete compound.

iv. Stage IV-Void-free compound solidification to form a final solid void-free polymer concrete composite shaped by the mold The void-free polymeric concrete compound is allowed to solidify in the mold. Upon complete cure, the void-free solid polymer concrete composite part is removed from the mold.

As detailed in Table 3 below, this polymer concrete example has been produced according to the four stage method described herein The particular formulation of the phases, choice of the condensable gas, and process parameters were adjusted to produce a void-free dielectric class polymer concrete composite meeting the visual count void-free criteria and the electrical partial discharge criteria indicated in the invention herein, and illustrated in FIG. 8. Moreover, under these conditions, the final composite is also a readily machineable material suitable for mass production of a high voltage electric current insulator, as illustrated in FIG. 8.

EXAMPLE 1

Table 3 reveals the material specification and process parameters used to yield a void-free and occlusion free polymer concrete material. The specific application of the generic method used to produce the example material given in Table 3 is illustrated in FIG. 3.

TABLE 3

TWO PRIMARY PHASE BATCH MIXING, BATCH MOLDING, MIXER TO MOLD METHOD POLYMER CONCRETE COMPOSITE

| | | | | Cast Dielectric Polymer Concrete (B-23) |
|---|---|---|---|---|
| A | | | | |
| MATERIAL SPECIFICATIONS | | | | |
| SOLID REINFORCEMENT | | | | |
| Aggregates, | | | | |
| Silica, @ Bulk density 1.6 gr/cc, @ Specific density 2.6 gr/cc, | | | [gr] | 3474.0 |
| Max. Diam. [mm] | Min. Diam. [mm] | | | |
| 0.595 | 0.420 | 22.40% | [gr] | 778.2 |
| 0.420 | 0.297 | 20.20% | [gr] | 701.7 |
| 0.297 | 0.149 | 35.50% | [gr] | 1233.3 |
| 0.149 | 0.000 | 21.90% | [gr] | 760.8 |
| ATH BACO S5 | | | [gr] | 1362.0 |
| Total Solids | | | | 4836.0 |
| CONDENSABLE GAS | | | | |
| Methyl-Methacrilate, MMA | | | [gr] | 48.4 |
| LIQUID RESIN MATRIX | | | | |
| Thermoset Resin Palatal A 430, bisphenol A polyester resin | | | [gr] | 987 |
| Mono Styrene | | | [gr] | 177 |
| Resin Matrix Viscosity, Ford # 4 ASTM cup @ 25° C. | | | [sec] | 34 |
| Catalyzation System (Inmediate use) | | | | |
| Cobalt Octoate 6%, | | | [% resin base] | 0.10% |
| DMA N,N-dimethylaniline. | | | [% resin base] | 0.15% |
| MEKP. Methyl Ethyl Ketone, Peroxide, | | | [% resin base] | 1.00% |
| B | | | | |
| PROCESS PARAMETERS | | | | |
| STAGE I, WASHING PRIMARY SOLID PHASE | | | | |
| Wetting Solid phase with liquid MMA | | | | |
| Closed mixer can, | | | [rpm] | 40 |
| Absolute pressure, | | | [Hg mm] | 760 |
| System temperature, | | | [° C.] | 30 |
| Time, | | | [minutes] | 10 |
| Gas vaporization, washing and air replacement with gas MMA | | | | |
| Closed mixer can, | | | [rpm] | 0 |
| Absolute pressure, | | | [Hg mm] | 50 |
| Initial Temperature, | | | [° C.] | 30 |
| Time, | | | [minutes] | 15 |
| STAGE II, AIR FREE MIXING OF TWO PRIMARY PHASES | | | | |
| Mixing Process | | | | |
| Resin injection | | | | |
| This process requires previous deaired liquid phase | | | | |
| Absolute pressure, | | | [Hg mm] | 760 |
| Closed mixer can, | | | [rpm] | 0 |
| Temperature, | | | [° C.] | 25 |
| Time, | | | [minutes] | 5 |
| Mixing in presence of condensable gas | | | | |
| Closed mixer can, | | | [rpm] | 40 |
| Absolute pressure, | | | [Hg mm] | ≧50 |
| Temperature, | | | [° C.] | 30 |
| Time, | | | [minutes] | 5 |
| Mold Filling Process | | | | |
| Mold attached to mixer | | | | |
| Absolute pressure, | | | [Hg mm] | ≧50 |
| Temperature, | | | [° C.] | 30 |
| Time, | | | [minutes] | 1 |
| STAGE III, CONDENSATION OF CONDENSABLE GAS | | | | |
| Absolute pressure, | | | [bar] | 10 |
| Time, | | | [minutes] | Included in Stage IV |
| STAGE IV, COMPOSITE FINAL FORMING & CURING | | | | |
| Curing | | | | |
| Absolute pressure, | | | [bar] | 10 |
| Temperature, | | | [° C.] | Room temperature |
| Condensation, Forming, Curing and Demolding Time, | | | [minutes] | 60 |

2. Continuous Mixing Polymer Concrete

FIG. 4 illustrates a continuous mixing process in five successive stage to yield a void-free polymer concrete composite material, including an optional storage stage between the characterized two phase non-condensable gas occlusion free and void-free polymer concrete compound and the final solid void-free polymer concrete composite. The description of these stages is as follows, as shown in FIG. 4.

i. Stage I-Elimination of air and other gases from the primary solid phase in parallel with degassing of the primary solidifiable polymer liquid phase The two primary phases are generally processed as in Stage I above. However, as this embodiment is produced in a continuous process, there are differences in the condensable gas washing method.

Figure 7:
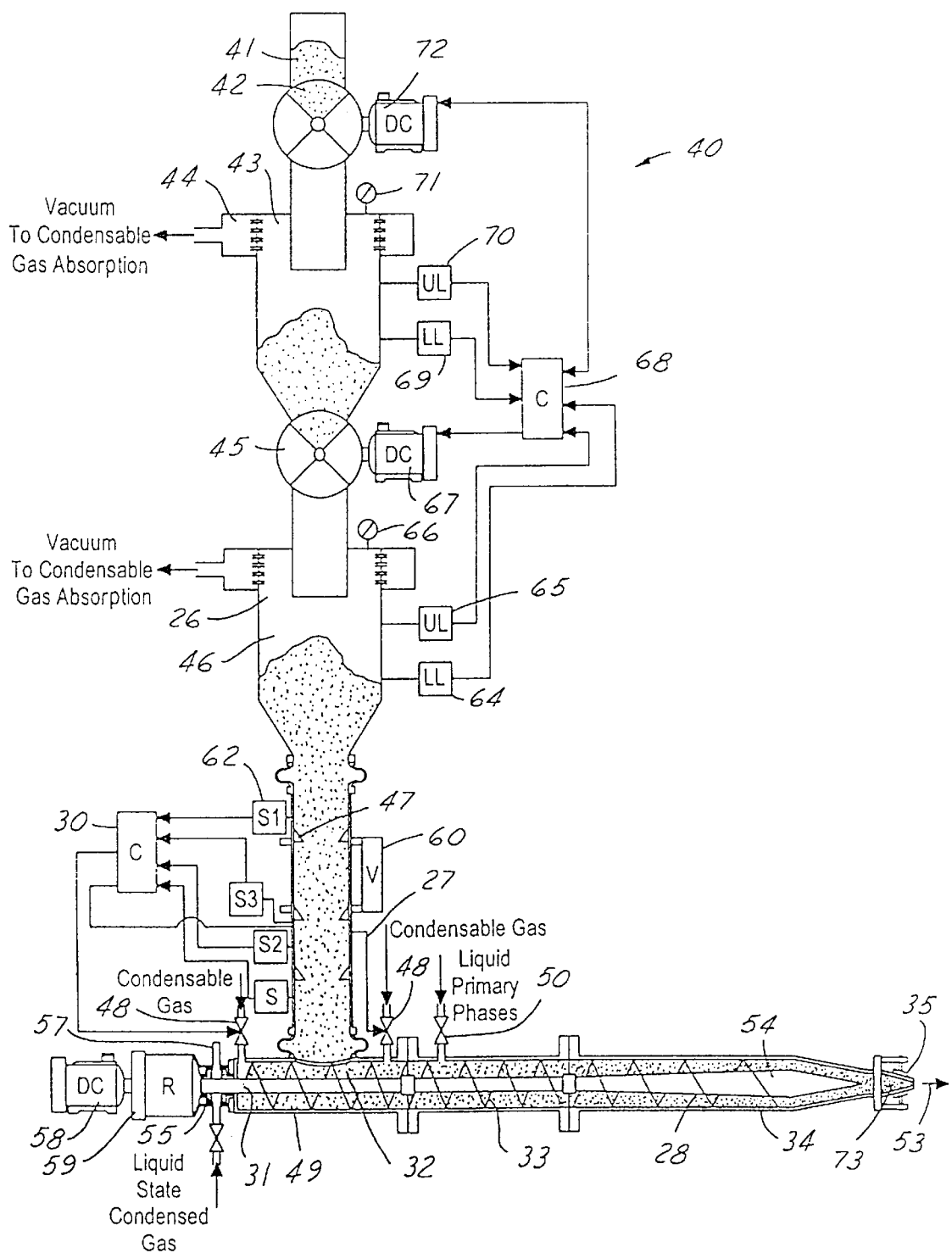
FIG. 7 is a schematic diagram of another apparatus of the present invention used, in this case, to continuously produce a void-free polymer concrete material, as illustrated in FIG. 4.

In continuous mixing apparatus embodiments for polymer concrete, illustrated in FIG. 7, the solids with entrained air, water vapor, or other gases are first gravity fed continuously under ambient conditions into a closed vertical solid loading hopper, and through a rotary seal valve located on the top of the hopper that prevents external air from entering and breaking vacuum. Vacuum in the loading hopper reduces the volume of entrained air and other gases in the solids and prepares the primary solid phase for gravity discharge through a lower seal valve into a vertical condensable gas replacement column, which is also under vacuum. The gas replacement column has a lower discharge through the shroud into the internal screw chamber of a conventional, continuous screw type, two primary phase solid/liquid mixing machine. Condensable gas, which is evaporated externally and fed through valves in the shroud of the continuous mixing machine first soaks the solids inside the screw chamber, and then streams upward towards the upper zone of the gas replacer column, soaking, in counter-current, the downward traveling solids of the primary solid phase. Continuous feed of de-aired solids for mixing is produced by the rotation of the mixing screw which advances the de-aired solids forward, where they are soaked in condensable gas, and allowing continuous gravity feed of processed solids from the filled gas replacement column.

The primary liquid polymeric resin phase is degassed free from air and other gases in a separate process using any conventional, effective, thin film degassing process.

ii. Stage II and Stage III—Air free mixing of the two primary phases, and subsequent condensation Air free continuous mixing process in the screw type machine is accomplished by screw rotation which advances forward the primary phase solids soaked in condensable gas and by feeding the degassed solidifiable liquid phase into the screw shroud. Mixing is followed by pressurized condensation of the condensable gas and densification of the mixed state compound in the screw type mixing machine. These steps are represented by successive adjacent zones, as illustrated in FIG. 7. The two phase void-free unsolidified compound characterized in the generic method of invention is discharged from the continuous mixing machine through a collapsible rubber spout choked by adjustable springs set to close down when the machine looses process speed, or to shut when stopped. The spout allows essential air-free continuous discharge as it prevents atmosphere air from penetrating inside the screw and shroud of the machine discharge port. The rubber spout is sized to suit the machine speed or capacity, compound characteristics, and other process parameters.

iii. Stage IV—Void-free compound packaging for storage

Void-free compound packaging for storage is done using collapsed, air free, flexible material packaging containers of desired shape and dimension, which are attached onto the discharge spout of the continuous mixing machine to successively receive the void-free solidifiable polymer concrete compound. Pressure exerted by the rotation of the mixing screw will force the compound out of the discharge port of the machine into the collapsible rubber spring loaded spout, which is forced to remain open by the moving void-free material pressing against the set pressure of the closing springs. In this way, the compound is loaded into the collapsed flexible container attached to the spout. As an individual container is filled, a proximity signal mechanism increases the closing spring tension, collapsing the rubber spout shut while the mixing machine continues to run. At this point, the volume of compound discharged expands the rubber body of the shut spout, which now acts as a compound accumulator, increasing its original volume. Meanwhile, the compound filled container is externally detached from the rubber spout and a new empty collapsed, air free, flexible container is re-attached on the spout to begin a new cycle. The high tension level of the springs is then signaled to start releasing back to the normal setting. The accumulated volume of void-free compound in the rubber spout thus begins to force itself out of the spout and into the new empty collapsed flexible container, as the spout spring tension becomes released to allow material discharge.

If used as forming molds, the containers filled with void-free unsolidified compound are sealed and the placed into a conventional autoclave, to harden in the shape of the containers at adequate combinations of pressure, temperature and time. Alternatively, the flexible container with unsolidified compound can be subsequently shaped by placing the sealed container and contents into a two or more part sectional mold, in which, by a combination of pressure and temperature the void-free unsolidified compound will harden into a solid, void-free, shaped polymer concrete composite.

Alternatively, if desired the filled flexible containers are sealed and placed in storage at reduced temperature, preferably in the range of +20° C. to −20° C., for up to 6 months depending on the characteristics of the solidification substances incorporated in the liquid resin system.

B. Fiber Reinforced Polymeric Composites, Methods and Materials

FIG. 5 illustrates a batch mix and forming processing by the inventive method in four successive stages to yield a void-free, solid, fiber reinforced polymer composite material in laminar shape, formed by Resin Transfer Method (RTM). The description of the RTM process stages are as follows, as per FIG. 5 and Table 4:

i. Stage I-Elimination of air and other gases from the primary solid phase in parallel with degassing of the primary solidifiable polymer liquid phase.

For RTM, and similarly for the newer SCRIMP process, vacuum is applied in the fiberglass solids in the mold before mixing with the resin. In the generic method, the fiber is first washed with a stream of condensable gas through the same resin injection ports (particularly in SCRIMP), and the condensable gas is injected or infused while the system is still under vacuum. The process is continued until condensable gas is detected at the vacuum exhaust ports. Under these conditions the condensable gas stream will have adequately replaced all entrained air, traces of water vapor in the fibers, and other gases that may have been entrained by the solids. However, in the case of complex shape 5 parts, or where mold corners are remote or difficult to access by the condensable gas stream, the gas replacement may not be totally effective. For this case, the generic process offers an additional alternative which consists of cutting the vacuum flow, but retaining vacuum presence in the system. This step is followed by pressure injected, outside evaporated, condensable gas at an elevated temperature, above the system's temperature, generally in a range of up to +40° C. above ambient temperature. This gas injection is continued until the gas pressure in the outside evaporator, at the constant above ambient temperature selected, is in equilibrium with the internal pressure of the system. This step is maintained until the amount of liquid in the external gas evaporation chamber has been evaporated. The additional external condensable gas at higher temperature that has been introduced will thereby elevate the temperature of the fiber solids and, thus, is able to reach the mold corners and other difficult spots because of its higher pressure. In this manner, the condensable gas is able to disperse some of the original entrained air, water vapor and other non-condensable gases that may not have been totally removed. As the temperature of the condensable gas drops by giving off its heat to the colder solids, it will partially condense until pressures are in equilibrium. At this stage vacuum is reestablished in the system and the condensable gas that has condensed will re-evaporate at each condensation spot and stream out under the vacuum, entraining the remaining air, water vapor and other gases. The solids are now air-free, water vapor-free and soaked with condensable gas.

The reinforcing solid, in Example 2, is a laminar fiberglass mat which is placed inside a close mold. The same mold will serve, in this case, as a degassing device, mixing device, condensation device and solidification/molding device. Upon placement of the fiberglass mat, the mold is closed and evacuated while a condensable gas, preferably evaporated externally from a gasifiable liquid, is fed into the closed mold under vacuum for a sufficient time to completely soak the fiber glass mat and to displace all entrained air and other gases in the fiber glass solid. $O_2$ presence in the exhaust ports of the mold can be monitored with an $O_2$, sensor. The processed primary fiber glass phase is now air-free, soaked with condensable gas, and ready for mixing with a separately degassed primary liquid polymer resin phase. Liquid phase degassing is done by conventional thin film technology as disclosed in prior art.

ii. Stage II-Air free mixing of the two air free primary phases

Stage II, air-free, two-primary phase mixing begins by infusing (SCRIMP) or injecting (RTM) the degassed primary liquid resin system under vacuum in the system. It is particularly important that the resin system is degassed and air-free. Once the liquid resin has been introduced filling the mold and soaking the solid phase, condensable gas in the system will be occluded in the mix.

Liquid polymer resin is injected under positive pressure per conventional RTM technology through conveniently located ports and distribution channels into the mold, until the liquid resin emerges from the separate vacuum exhaust ports. At this point both the vacuum and resin ports are closed and left closed until the beginning of the condensable gas condensation.

iii. Stage III-Condensation of the condensable gas

Depending on the choice of condensable gas, condensation of the condensable gas, typically Stage III may have already occurred in Stage II, under the pressure of the resin injection. This is more likely in cases such as the straight forward laminar shape of the mold used in Example 2, and detailed in Table 4. However, in more complex shapes, and/or pieces with variable sections, it is preferred to place the closed mold with contents in a pressure chamber and pressurize the system to an adequate pressure for a sufficient time to achieve a void-free fiber reinforced polymer compound of the quality level required per conventional RTM technology. The characterized compound invention condition will have been reached when:

1) Washing of air, water vapor and other gases by the condensable gas has been accomplished; here entrained water vapor is deleterious and eliminating it improves the polymerization reaction.
2) Soaking of the fiber surfaces with condensable gas modifies and lowers the glass fiber surface tension level; the liquid when coming in contact with the fiber to form the interfacial bond now comes in contact first with the condensable gas soaked fiber surfaces; and, moreover, without back pressures from non-condensable gas occlusions; wet out of the fiber by the resin and interfacial bonding will be improved.

iv. Stage IV—Solidification of the void-free fiber reinforced polymeric compound into a void-free composite shaped by the mold Solidification of the compound will occur, according to the polymerization art described in RTM technology, to produce a final solid, laminar shaped, void-free fiber reinforced polymer composite that complies with the visual count void-free criteria established in the invention. A detailed data sheet is given in Example 2 below.

EXAMPLE 2

Table 4 reveals the material specifications and process parameters to yield a void-free and occlusion free fiber reinforced polymer (FRP) material. The specific application of the generic method used to produce the example material given in Table 4 is shown in FIG. 5.

TABLE 4

TWO PRIMARY PHASE BATCH MOLDING, IN MOLD MIX AND FORM BY RTM METHOD LAMINAR FRP COMPOSITE

|  |  | Laminar F.R.P. R.T.M. (FV-9) |
|---|---|---|
| A MATERIAL SPECIFICATIONS SOLID REINFORCEMENT Filament Fiber, |  |  |
| Glass fiber (MAT 450 gr/m2) | [gr] | 121 |
| CONDENSABLE GAS |  |  |
| Methyl-Methacrilate, MMA | [ml] | 6 |
| LIQUID RESIN MATRIX Thermoset Resin |  |  |
| Palatal P 80, Unsaturated polyester, | [gr] | 314.5 |
| Viscosity, Ford # 4 ASTM cup @ 25° C. | [sec] | 34 |
| Catalyzation System (Inmediate use) |  |  |
| Cobalt Octoate 6%, | [% resin base] | 0.10% |
| DMA N,N-dimethylaniline. | [% resin base] | 0.15% |
| Methyl Ethyl Ketone, Peroxide, | [% resin base] | 1.00% |
| B PROCESS PARAMETERS STAGE I, WASHING PRIMARY SOLID PHASE Gas replacement RTM mold |  | N/A |
| Absolute pressure, | [Hg mm] | 40 |
| Temperature, | [° C.] | 30 |
| Time, | [minutes] | 12 |
| STAGE II, AIR FREE MIXING OF TWO PRIMARY PHASES Mixing Process Resin Injection This process requires previous deaired liquid phase |  |  |
| Absolute pressure, | [Hg mm] | 760 |
| Temperature, | [° C.] | 25 |
| Time, | [minutes] | 3 |
| Fiber Glass in RTM mold RTM mold filled with fiber glass and inunded with condensable gas |  |  |
| Absolute pressure, | [Hg mm] | ≧50 |
| Temperature, | [° C.] | 25 |
| STAGE III, CONDENSATION OF CONDENSABLE GAS |  |  |
| Absolute pressure, | [bar] | 6 |
| Time, | [minutes] | Included in Stage IV |
| STAGE IV, COMPOSITE FINAL FORMING & CURING Curing |  |  |
| Absolute pressure, | [bar] | 6 |
| Initial temperature, | [° C.] | Room temperature |
| Time, | [minutes] | 35 |
| Condensation, Forming, Curing and Demolding Time, |  | 90 |

C. Conclusion

The descriptions detailed above illustrate the many facets and applications of the generic void-free method in composite technology and production. The inventive method can be utilized to produce a vast array of void-free polymeric compounds and composites. Moreover, a polymer concrete sample and a fiber reinforced polymer composite sample free of gas occlusions and voids has been produced and detailed herein.

Figure 6A:
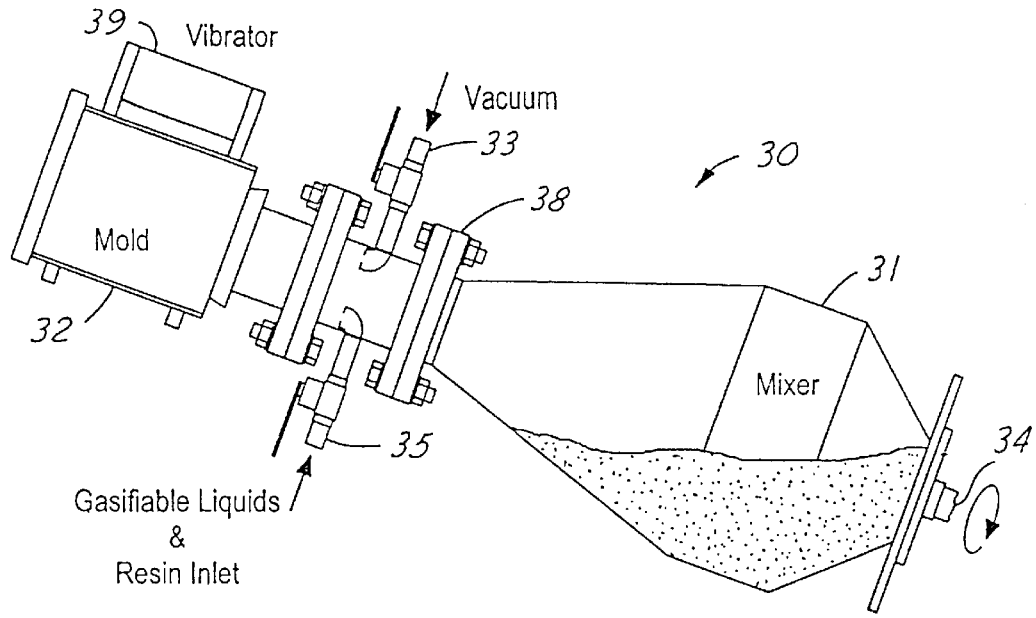
FIGS. 6A–B are schematic diagrams of an apparatus of the present invention, used in this case to produce a batch mixed polymer concrete material, as illustrated in FIG. 3.
Figure 6B:
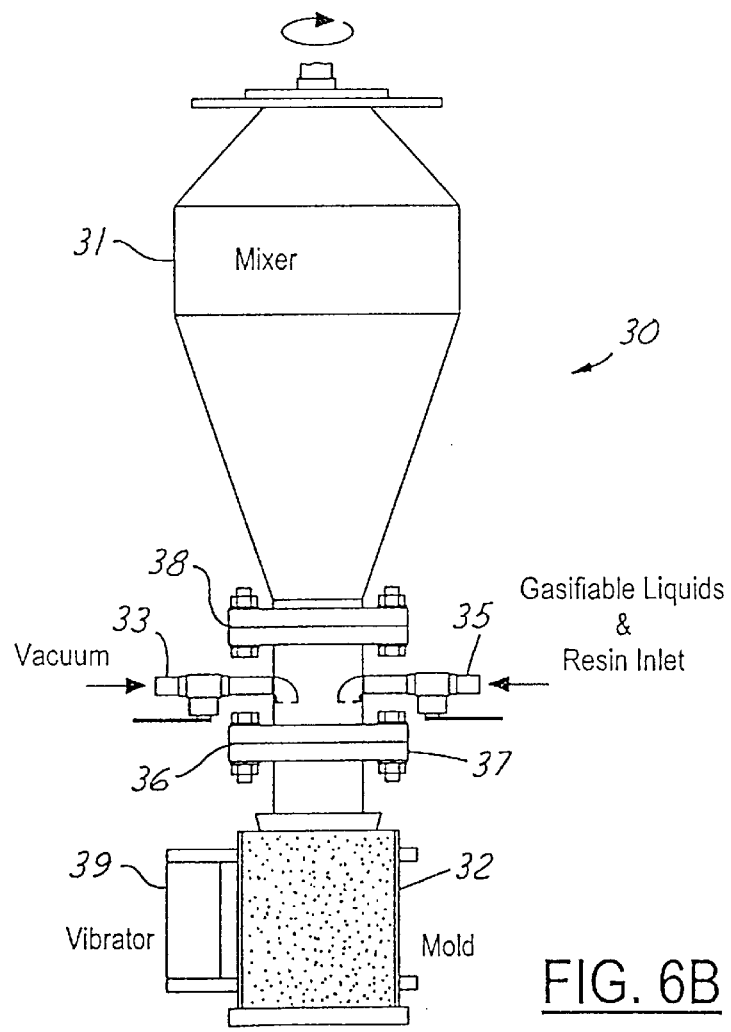

Apparatus a. Apparatus for Batch Production of Void-Free Polymer Concrete Compound and Composites FIG. 6 illustrates a preferred embodiment of the apparatus for batch replacement of air, water vapor, or other gases normally contained within the interstices, spaces or voids of the primary solid phase at ambient temperature and pressure, by a condensable gas prior to batch mixing with a solidifiable liquid phase to yield, a two-primary phase solidifiable polymer concrete compound free from non-condensable gas occlusions. The compound is poured from the mixer into a mold in air-free and non-condensable gas free environment. When the solidifiable compound is in the mold, the apparatus is pressurized to condense the condensable gas in the compound already in the mold, and optionally, can be solidified in the mold to produce a gas occlusion free and void-free composite formed in the shape or configuration of the mold. The apparatus 30 shown in FIGS. 6A and 6B include mixing chamber 31 with a mold 32 attached to it. The apparatus 30 has 2 operating positions: for mixing (FIG. 6a) and for pouring the solidifiable mixed compound into the mold (FIG. 6b). The primary solid phase is placed in the mixing chamber 31, preferably with a Class I gasifiable liquid. Vacuum is applied through the vacuum inlet port 33 and the entire assembly is rotated mechanically about its longitudinal axis as indicated at 34 for 1 to 2 minutes with vacuum shut off. The contents of solids and gasifiable liquid are washed thoroughly together. This allows the gasifiable liquid to completely wet out the solids and to begin an evaporation process. The resulting condensable gases evaporated from the liquid to replace the air, water vapor associated with air, or other gases in the solids. The system is stopped for 1 or 2 minutes and vacuum reestablished to evacuate the air, water vapor associated with air or other gases entrained in the condensable gas. The wash cycle is repeated, preferably at least four times, without addition of condensable gas. Upon completion of the washing stage, the primary solid phase will have all its voids filled with condensable gas.

At this point the primary solidifiable liquid resin system previously degassed is infused by vacuum into the apparatus through the inlet port shown in FIG. 6a. A mixing cycle of the two primary phases in the presence of condensable gas only is started by mechanical rotation of the apparatus, with vacuum shut off, and continued for 4 to 5 minutes. At the end of the mixing cycle the two primary phase solidifiable mixed compound is free from non-condensable gas occlusions and ready to be poured and gravity fed into the attached mold 32.

As illustrated in FIG. 6b, this step is accomplished by rotation of the apparatus 30 until the attached mold 32 is in the bottom position. Once the solidifiable mixed state compound is lodged in the mold, at rest, a thin film of liquid resin is formed over the top exposed surface after a short period of vibration (depending on the size and shape of the mold of) 1 or more minutes with the vibration device 39. Pressure in the apparatus 30 is increased by allowing pure $CO_2$ gas to enter into the apparatus through inlet port 35. This pressurizing gas is at atmospheric pressure or preferably at an absolute pressure at least equal to 2 times the condensable gas vapor pressure at the process temperature. The $CO_2$ gas environment maintains the system air free and eliminates presence of $O_2$ from outside air to ensure optimal solidification of the primary solidifiable liquid phase in the compound. Upon pressurization, the pressure of the $CO_2$ is exerted on the mold contents through the thin barrier layer of resin on its upper exposed surface, which is sufficient to prevent $CO_2$ gas dispersion into the material in the mold, yet its pressure will condense the condensable gas within the solidifiable mixed state compound in the mold, and further maintenance of $CO_2$ gas pressurized condition for at least 1 minute will ensure the solidifiable liquid phase will enter all voids in the compound. At this stage, the two primary phase solidifiable compound in mixed state in the mold 32 will have reached the characterized condition of freedom from non-condensable gas occlusions and voids. To obtain a void-free molded composite, the mixed state compound is left to solidify in the mold 32 under positive $CO_2$ absolute pressure conditions. If desired, consolidation of the solidifiable compound in the mold can be facilitated by the use of a vibration device 39 mounted on the mold 32, prior to curing.

It will also be noted that, in the apparatus 30, the mold 32 is removable as indicated by the bolted joint 36 and bolt fasteners 37. This allows the compound to be cured in the mold 32 off-line while a new, empty mold is reattached to the apparatus 30 so that compound production can be expedited. Likewise, the mixer 31 is demountable at a similar bolted joint 38 to allow maintenance and repair, and also to allow attachment of other mixing chambers 31 of differing capacities and geometrical shapes, or allow attachment of a hopper equipped with a conventional air tight auger screw type discharge device in place of mold 32, to intermittently discharge discrete metered amounts of gas occlusion free solidifiable compound from the apparatus into external molds.

b. Apparatus for Continuous Void-Free Polymer Concrete Compound Production

FIG. 7 illustrates a preferred embodiment of an apparatus 40 for continuous void-free production of polymer concrete. As explained above in detail, the apparatus 40 can be used in a method of production involving the replacement of air, water vapor or other gases normally contained within the interstices, spaces or voids of the primary solid phase at ambient temperature and pressure, by a condensable gas prior to continuously mixing with a solidifiable polymer concrete compound free from non-condensable gas occlusion and voids.

The apparatus 40 includes a condensable gas displacement/replacement counter-current column 46 with an upper zone vacuum chamber 26. Within the chamber 26, a controlled vacuum condition is maintained to exhaust air, vapors and gases, normally entrained in the primary solid phase which are continuously displaced/replaced by a stream of condensable gas. A lower discharge zone 27 is connected at one end to the column 46 and to the shroud 49 of a continuous screw type mixing apparatus 28. Inlets 48 for the condensable gas are provided in the shroud 49 to flood with the condensable gas the discharge zone 27 of the column 46 and the adjacent volume inside the shroud where processed solids are discharged. Condensable gas horizontal deflector baffles 47 are provided inside the column wall to effectively distribute the upward stream of condensable gas, traveling towards the upper zone vacuum chamber 26, with the primary solid phase falling by gravity in the column. This counter flow of condensable gas produces a washing effect which displaces and replaces entrained air and other gaseous substances in the primary solid phase by the condensable gas.

Since the counter flow of condensable gas is at positive pressure flow to facilitate the washing process, it will be recognized that this streaming condition reduces consumption of the condensable gas and increases the efficiency of the apparatus 40. Oxygen sensing devices 62 are provided in the column 46 at different levels to monitor the presence of air and to ensure no oxygen is detectable in the lower discharge zone 27 or in the flooded shroud zone 49 of the continuous mixing apparatus 40. This monitoring is achieved by means of a gas control and feedback system 30. If oxygen is detected by the monitors 62, the control system 30 appropriately adjusts the level of condensable gas entering the inlets 48. Optionally, in a preferred embodiment, a vibrating device 60 with vibration control mechanism is attached externally to the column wall to avoid agglomeration and promote free flow of the primary solid phase, and also to ensure its continuous gravity downward travel.

Flexible connections 63 are provided at the upper and lower extremes of the column 46, to connect the column with the upper zone vacuum chamber 26, and to connect the lower discharge zone 27 with the shroud 49. Structure is provided above the upper zone 46 of the column for a vacuum chamber 44 with an exhaust and a receiving hopper 43, also under vacuum, for controlled feeding of the primary solid phase into the column 46. The receiving hopper 43 is provided with rotating seal valves 42 and 45 located at its upper inlet port 41 and at its lower discharge port to provide passage, under vacuum, of the primary solid phase from atmospheric conditions into the controlled vacuum gas displacer column 46. The upper inlet port seal valve 42 of the hopper 43 is connected to the external supply of primary solid phase at open atmospheric conditions and prevents breaking vacuum inside the receiving hopper 43. The vacuum chamber 44 in the hopper 43 is provided with vacuum to also assist in the reduction of the amounts of entrained gases and vapors in the incoming primary solid phase as it continuously passes through the hopper 43, so upon its discharge into the upper zone 26 of the gas displacer/replacer column apparatus, the entrained air, gas and vapor substances in the solids have been significantly reduced by vacuum. The lower discharge seal valve 45 of the receiving hopper 43 allows the maintenance of differential vacuum levels between the hopper 43 and the column 46 for more effective control of the displacement/replacement function in the gas replacer column apparatus. At the lower discharge 27 of the column 46 into the continuous mixing device 49, the processed primary solid phase is air and water vapor free and flooded with condensable gas, essentially ready to begin the continuous mixing process with a primary solidifiable liquid phase (which has been previously degassed externally), to form a two primary phase unsolidified polymer concrete compound exempt of gas occlusions, and voids, as per the present invention.

The mixing apparatus 40 of the present invention is also provided with a motor control 68 for controlling the operation of the rotating seal valves 42,45. Sensors 69,70 located in the hopper 43 sense the level of the solids therein and provide a signal to the controller 68. A control signal is then provided from the controller 68 to the DC motor 72 controlling the operation of the upper rotating valve 42. Likewise, sensors 64 and 65 located in column 16 sense the level of the solids therein and provide a signal to the controller 68. A control signal is then provided to DC motor 67 for controlling the operation of the lower rotating seal valve 45. Meters 66, 71 are provided in column 46 and the hopper 43, respectively, in order to sense the vacuum level within these enclosed containers.

The continuous mixing apparatus 40 comprises preferably a continuous mixing device 27 of the shrouded rotating screw type, appropriately modified to comply with the following requirements:

1. Condensable gas inlet ports 48 into the screw shroud 49 must be provided with a mechanism 30 for adjusting the pressure and flow of the condensable gas. Inlet ports 48 should be suitably located adjacent to the column discharge zone 27 where the air-free primary solid phase, soaked with condensable gas, enters the screw shroud 49, so as to provide a continuous counter-current stream of condensable gas through the connection between the shroud and the discharge zone moving upwards into the gas replacer column 46.

2. The internal zone within the screw shroud 49 must be maintained continuously flooded with condensable gas at all times when the mixer 28 is running. Furthermore, that zone must be provided with a shielding, such as a double seal device 55 to maintain the drive extension 31 of the mixing screw 28 flooded with condensable gas in liquid state to prevent contamination from leaks of external atmospheric air. Furthermore, the drive extension 31 connects a reducer 59 mounted on the drive output of DC motor 58 which rotates the mixing screw 28. The level of liquid state condensable gas in the double seal chamber 55 can be determined by the gas level device 57.

3. The entry port 50 for feeding degassed, air-free primary solidifiable liquid phase into the continuous mixing device 40 must be suitably located downstream, and sufficiently away from the processed primary solid phase entry zone 32 of the shroud 49.

4. The downstream configuration of the mixing screw 28 and shroud 49 in the continuous mixing device between the solidifiable liquid phase enter zone 33 and the final discharge port 53 of the continuous mixing device is subject to the following design requirements:

i) The rotating screw 28 must impart sufficient absolute pressure within any point of the two primary phase mixed state compound being formed as it advances towards the discharge port 53 and to completely condense the condensable gas within the primary liquid phase of the mix and to force liquid resin into any voids. Such pressure must be maintained over the range of screw operational speeds, including its minimum speed. This may be accomplished by means of an enlarged diameter section 54 of the multisection mixing screw 28. This section 54 serves to increase the pressure of the mixture within this condensation zone 34 by reducing the annular space between the screw 28 and the shroud 49.

ii) The liquid state condensed gas must be sufficiently dispersed and diffused within the solidifiable liquid phase of the mix in the condensation zone 34, before the compound mix reaches the discharge port 53 of the mixing device 40.

iii) Atmospheric air must be prevented from entering the compound mix through the discharge port 53 and contaminating the gas occlusion and void free two primary phase mixed unsolidified compound.

5. Machine void-free compound discharge must provide means for discharge of a non-condensable gas occlusion free and void-free compound so that its characterization is assured when the machine stops, such as an air tight, sealable, flexible spout 73 to seal off the external air entrance. Also provided is a means for discharging the compound so that its void-free characterization is assured, such as air tight, sealable, flexible spout stops 35 as having spring or other biasing means to maintain tight closure. The apparatus is further capable of accumulating discrete and sufficient amounts of void-free polymer concrete compound in it to enable intermittent discharge of the void-free material into discrete receiving containers of discrete unit volume, under air free conditions.

Thus, it will be appreciated that the principles of the apparatus of the present invention can be applied to numerous other continuous mixing devices having similar features.

Product and Applications

Electric insulators intended for high voltage applications previously have been preferably made of porcelain materials. However, more recently it bas been found that polymer concrete could be used as the material for such insulator applications. Additionally, these insulators provide advantages in both cost and performance. U.S. Pat. No. 4,210,774, for example, discloses a polymer concrete insulator having dielectric and mechanical properties far superior to those of conventional porcelain insulators.

However, an inherent disadvantage of polymer concrete electric insulators has been the presence of voids or gas occlusions, as the result of insufficient or inadequate degassing and mixing of the solidified material. It is well known that increased number of voids, or gas occlusion porosity, resulting from air and associated water vapor entrainment in solids, adversely affects the dielectric and mechanical strength of insulators, and encourages partial discharges leading to early failure within the material body. To overcome this problem, ideally, a void-free material would be desirable for use in high voltage electrical insulators.

The insulators prepared from special formulations for void-free dielectric polymer concrete, as detailed in Example 1, produced by the generic void-free method of the present invention, are designed to be formed or shaped by machining the insulator shape directly from cast void-free polymer concrete cylindrical stock, or by conventional shape molding methods. The resulting insulators formed by machining have controllable surface finish and very tight dimensional tolerances, as well as excellent and improved dielectric characteristics and mechanical strength. The finish of the machined surfaces can be controlled for enhanced adhesion of specialized material coatings in thin films on to the machined surfaces, rendering the insulator non-hygroscopic and hydrophobic for outdoor service.

Moreover, insulators fabricated from void-free dielectric polymer concrete made in accordance with the present invention exhibit dramatically increased voltage threshold for initiation of partial discharges within the body of the insulator, thus extending their useful life.

Figure 8A:
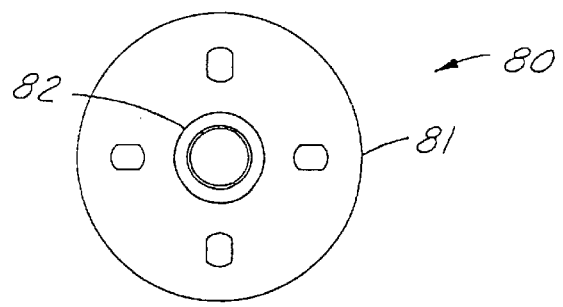
FIGS. 8A–C are schematic representations of an electric insulator machined from a void-free polymer concrete composite material produced according to FIG. 3.
Figure 8B:
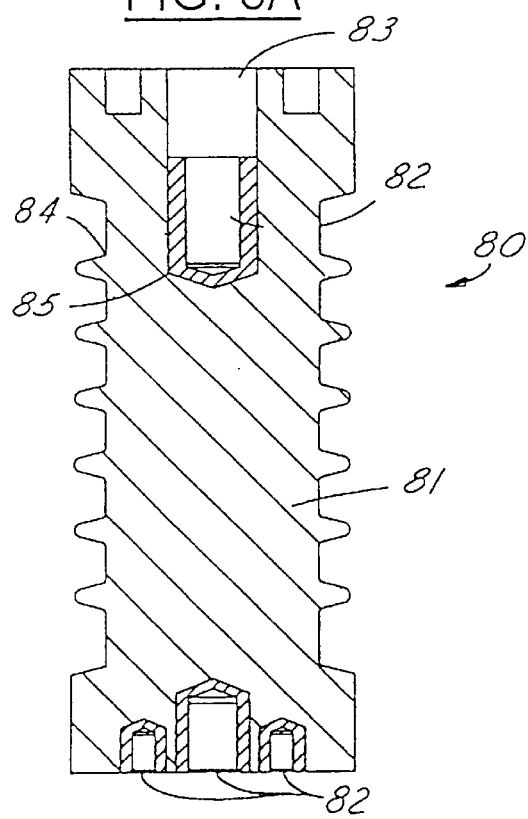
Figure 8C:
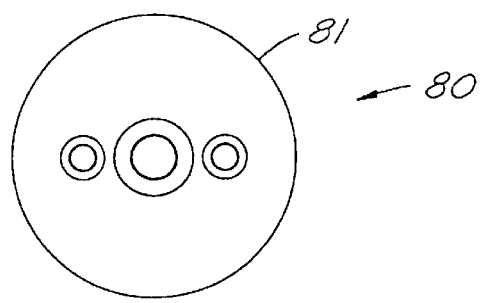

FIGS. 8A–8C illustrate an insulator produced from methods and materials of the present invention. FIGS. 8A and 8C are top and bottom views, respectively, and FIG. 8B is a longitudinal cross-sectional view. The insulator 80 in FIG. 8 is a resistive voltage grading device whose body 81, shields 84, all bores 83 and holes 85 to install threaded metallic contacts 82, have been machined from a cylindrical stock of void-free polymer concrete composite material complying with both the visual count void-free criteria of no visible voids of 0.5 micron diameter at 1250× magnification and dielectric criteria of no visible partial discharges seen in an oscilloscope screen when subjected to voltages of 90–100 KV.

The good machinability of the void-free dielectric polymer concrete material of the present invention enables production of all classes and types of electric transmission and distribution insulators, as well as other devices such as bushings and insulator plates or rings. Insulators include suspension pin type, strain, line post, etc., preferably in higher voltages ranges up to 100 KV or even beyond. One important discovery from the work done in this invention is that material formulations appropriate for void-free, dielectric polymer concretes have also excellent machinability. Another discovery is that finished electric insulators of high quality can be efficiently shaped by conventional machining with special cutting tools from cast polymer concrete stock material produced using the inventive void-free method. Yet another discover is that machining is a high efficiency and high productivity forming method far superior to the conventional method of forming insulators by shape molding materials in conventional shape molds, in that better quality insulators can be produced faster, with shorter lead times and at much reduced mold and labor costs. Likewise, very accurately dimensioned dielectric polymer concrete flat plates parts can be produced, cut from cast polymer concrete stock into slabs and then surface finished by milling, drilling, boring, etc. as required.

Sheet Molding Compounds, Bulk Molding Compounds, and Pultrusion

Special care may be necessary during the primary liquid phase degassing step to produce void-free composites that are formed by pultrusion or by compression molding—composites made from sheet molding compound (SMC) or bulk molding compound (BMC). Under many circumstances, conventional methods can be used to degas the primary liquid phase. For example, when polymerization occurs at ambient temperature and pressure, thin-film vacuum degassing of a low viscosity thermosetting resin is generally sufficient to produce a void-free fiber or aggregate-reinforced composite, as long as the primary solid phase has been de-aired by washing with a condensable replacement fluid. However, when solidification or curing occurs at elevated temperature and pressure—as with composites formed using compression molding or pultrusion—physical and chemical changes within the void-free compound may lead to formation of gas occlusions, porosity or voids in the composite.

Voids in a composite made from a substantially void free solidifiable compound result from gas formation that can occur during the solidification and/or forming (compression molding) steps. Such gassing may occur for several reasons. A component of the solidifiable compound may decompose at the high temperatures and pressures involved in compression molding. For example, granular aluminum trihydrate is often used as a filler in SMC and BMC formulations, but may decompose and liberate water at about 180° C.–200° C. and 1 bar. In addition, compound constituents may chemically react at elevated temperature and pressure producing unwanted gas. It is well known, for example, that calcium carbonate, which is a common filler, can react with acidic groups in unsaturated polyester resins forming $CO_2$.

Gas can form in other ways in unsolidified compounds. Generally, the liquid resin system may contain dissolved fluids that remain in solution when degassed under vacuum using conventional methods. These fluids gas when the resin is exposed to high vacuum or high temperature or when, at moderate vacuum, the resin is heated to high temperatures; the presence of solids appears to increase gas production as well. Furthermore, when curing or solidification occurs at a temperature greater than the dissolved fluid's critical temperature, the fluid will not revert to the liquid state at any pressure once it has been vaporized by applying vacuum, heat or both vacuum and heat. In some cases, even the liquid monomer in a polyester resin system or the condensed washing gas may vaporize from the unsolidified compound when cured at sufficiently high temperatures, but without sufficient pressure.

Thus, when solidifying sheet molding or bulk molding compounds, and when curing pultrusion-formed composites or other two primary phase polymeric compounds at elevated temperature and pressure, the primary liquid phase should be adequately degassed prior to mixing under the following conditions to help prevent voids or gas occlusions in the composite. If the compound, for example, is cured at ambient temperature and at pressures up to about 8 bar—as is the case for polymer concrete and fiber reinforced composites—the primary liquid phase need only be degassed under a vacuum of about 50–80 mm Hg and at a temperature sufficient to ensure that the viscosity of the primary liquid phase does not exceed about 200 cp. Furthermore, if the compound is cured at ambient pressure or up to about 8 bar and at a temperature between about 50° C. and about 80° C., the primary liquid phase should be thin-film degassed at ambient temperature under a vacuum of about 10–30 mm Hg. Finally, if the compound is cured at temperatures above 80° C. and compression molded at pressures exceeding about 40 bar, degassing should first be carried out at an appropriate temperature in a stripping column or similar desorption apparatus at a pressure lower than the vapor pressure of the solvent monomer of the primary liquid phase resin system. For a typical polyester resin system using styrene monomer, this corresponds to a pressure between about 30 mm Hg and 40 mm Hg absolute at 50° C. A standard stripping column designed for the above degassing conditions can be used.

In addition to degassing the primary liquid phase, it may also be necessary to 5 degas the condensable gas or replacement fluid using the same techniques described for degassing the primary liquid phase. Generally, the replacement fluid should be degassed in the same manner as the primary liquid phase when the replacement fluid is the solvent monomer of the primary liquid phase resin system.

Apparatus for Continuously De-Airing Continuous Fibers

Figures 9A, 9B:
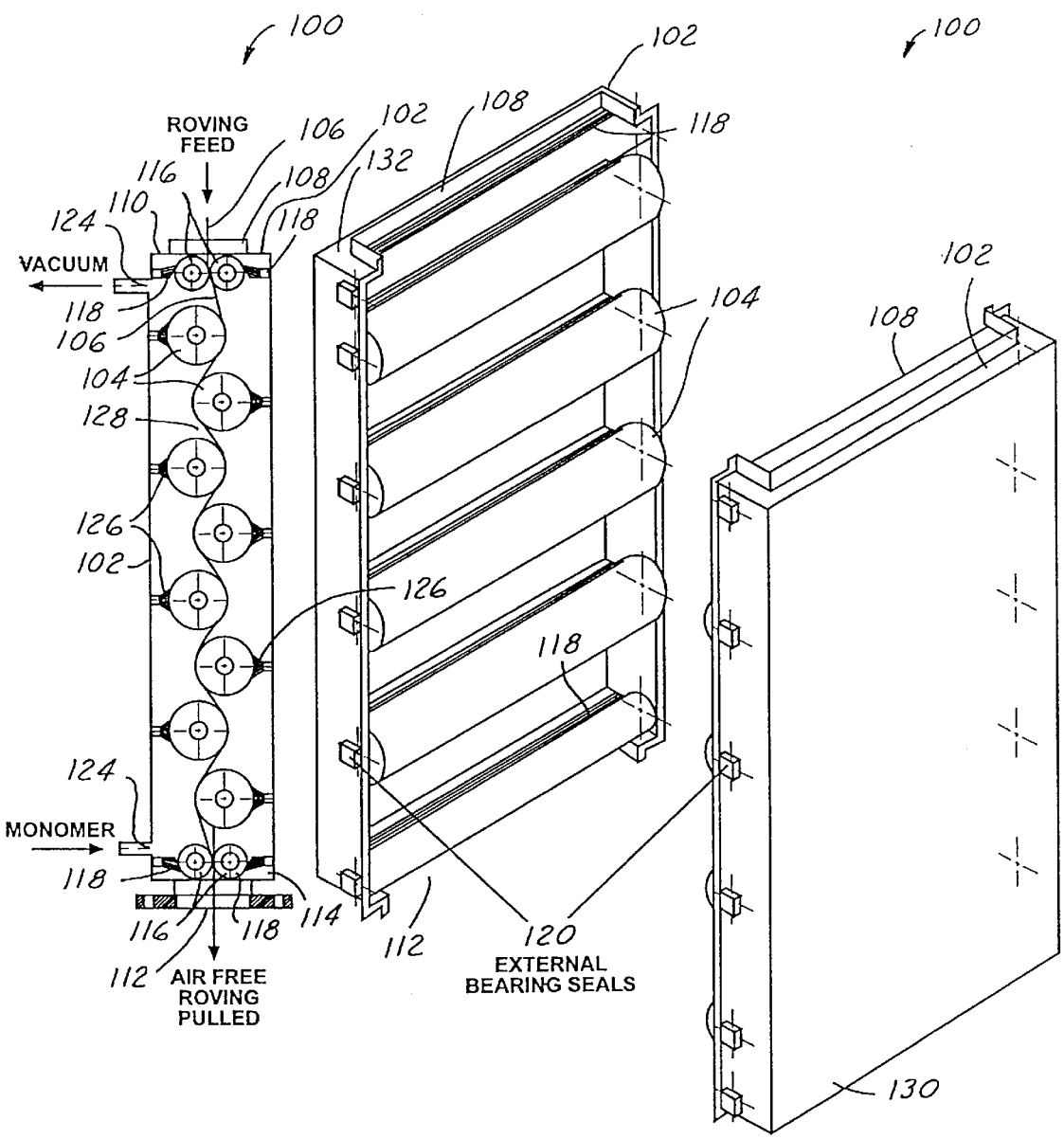
FIG. 9a is a perspective, exploded view of an apparatus for continuously de-airing fibers under slight vacuum with a vapor-phase replacement fluid.
FIG. 9b is a cross-sectional view of an apparatus for continuously de-airing fibers under slight vacuum with a vapor-phase replacement fluid.

FIG. 9a and FIG. 9b illustrate an apparatus for continuously de-airing fibers (rovings, mats or veils) with a condensable gas prior to mixing with the degassed primary liquid phase. The apparatus is especially useful for stage I treatment of the primary solid phase in sheet molding compounds and in compounds formed by pultrusion or filament winding.

The fiber washing apparatus 100 operates in a manner similar to treatment of the primary solid phase in the RTM application described above: air and other noncondensable gases are removed from continuous fibers by replacing the noncondensable gases with a fluid that is substantially a vapor throughout the washing stage. The apparatus comprises a pressure chamber 102 and a number of parallel, freely rotating, resilient conveying rollers 104 that are mounted within the pressure chamber 102. During the washing step, fibers 106 are introduced into the pressure chamber 102 through an entrance port 108 located in the top end 110 of the pressure chamber 102, pass over the conveying rollers 104, and leave the pressure chamber 102 through the exit port 112 located in the bottom end 114 of the pressure chamber 102. Pairs of sealing rollers 116 and flexible seals 118 located at the entrance 108 and exit 112 ports, help maintain a slight vacuum within the chamber 102. Also, conveying roller bearing seals 120, help prevent air infusion into the chamber 102. Condensable gas (monomer in a polyester resin system, for example) is introduced into the pressure chamber 102 through a feed port 122 located near the exit port 112, flows upward in a direction counter to the direction of the fibers, and exits the pressure chamber 102, along with entrained air and other noncondensable gases, through a vacuum port 124 located near the entrance port 108. As can be seen in FIG. 7b, internal seals 126 force the condensable gas to pass through the fibers 106 in the gap 128 between each conveying roller 106. To thread the continuous fibers 106 prior to treatment, the pressure chamber 102 can be split along its length into a front shell 130 and a back shell 132 shell. A perimeter seal 134 is provided to prevent air intrusion when the chamber is reassembled.

Figure 10:
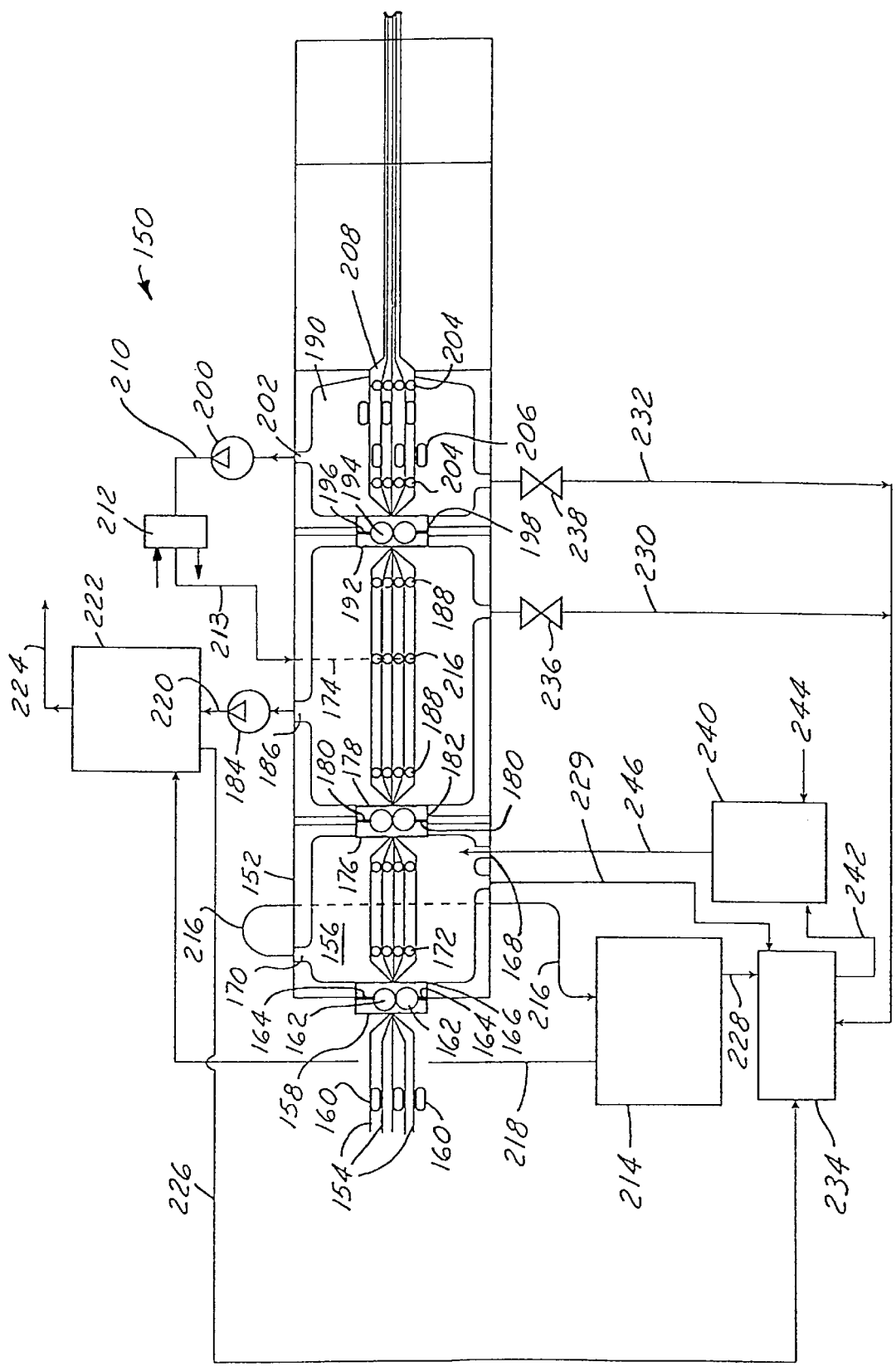
FIG. 10 is a schematic drawing of an apparatus for continuously de-airing fibers under high vacuum.

FIG. 10 illustrates a second embodiment of an apparatus for continuously de-airing continuous fibers with a replacement fluid prior to mixing with the degassed primary liquid phase. Whereas the apparatus shown in FIGS. 9a and 9b can be used to wash fibers under slight vacuum—absolute pressures of about 500 mm Hg or more, for example—the embodiment shown in FIG. 10 can be used to wash fibers under higher vacuum by vaporization and condensation process. Typically, the second embodiment is coupled directly to equipment for carrying out stage II mixing and stage III condensing steps, so that there is minimal or no air intrusion during the three stages.

The fiber washing apparatus 150 shown in FIG. 10 is comprised of a pressure vessel 152 having three distinct processing chambers, although the apparatus can function with two processing chambers or more than three processing chambers. Single or multi-layered continuous fibers 154 enter a first processing chamber 156 through an entrance port 158. The fibers 154 slide over heating and cooling bars 160 located immediately upstream of the entrance port 158 to adjust the temperature of the incoming fiber 154. The fibers 154 pass through a pair of resilient nip rollers 162 or similar sealing devices that minimize atmospheric air intrusion in the first processing chamber 156. Flexible seals 164, which are located along the perimeter of the interior walls 166 of the entrance port 158, further minimize atmospheric air flow between the nip rollers 162 and the interior walls 166 of the entrance port 158.

As the fibers 154 pass through the first processing chamber 156, they are bathed in a saturated vapor of a replacement fluid (condensable gas). The vapor enters the bottom of the first processing chamber 156 through a fluid inlet port 168, travels upward through the first processing chamber 156, and around and through the fibers 154, displacing air and other noncondensable gases trapped in the fibers 154. The displaced gases, and any air that has leaked through the nip rollers 162 or flexible seals 164, are swept out of the first processing chamber 156 by the rising vapor via a fluid outlet port 170. For the most part, replacement vapor fills the first processing chamber 156, where pressure is maintained at ambient pressure or slightly less than ambient pressure. The layers of fibers 154 are separated by supports 172, which are transverse to the direction of travel of the fibers 154 and which enhance contact between the fibers 154 and the replacement fluid vapor stream. Because the temperature of the fibers 154 is less than the saturation temperature of the replacement fluid at the pressure within the first processing chamber 156, a substantial portion of the replacement fluid condenses uniformly or evenly on the fibers 154. As a result, the fibers 154 are thoroughly wetted with replacement fluid 154 when they leave the first processing chamber 156.

The wetted fibers 154 enter a second processing chamber 174 through an entrance port 176. Similar to the first processing chamber 156 entrance port 158, the fibers 154 pass through a pair of resilient nip rollers 178 or similar sealing devices, which help prevent the flow of vapor from the first processing chamber 156 into the second processing chamber 174. Flexible seals 180, which are located along the perimeter of the interior walls 182 of the entrance port 176, further minimize vapor flow into the second processing chamber 174.

A vacuum pump 184, which communicates with the second processing chamber 174 through fluid outlet port 186, maintains an absolute pressure in the second processing chamber 174 that is less than the pressure within the first processing chamber 156. Moreover, the pressure in the second processing chamber 174 is less than the vapor pressure of the replacement fluid within the fibers 154 at the entrance port 176, so that, as the fibers 154 travel through the second processing chamber 174, condensed replacement fluid within the interstices of the fibers 174, vaporizes. This vaporization dislodges occluded air and other noncondensable from the fibers 154. As in the first processing chamber 156, the layers of fibers 154 within the second processing chamber 174 are separated by transverse supports 188.

Fibers 154 enter a third processing chamber 190 at entrance port 192 through resilient nip rollers 194 or through a similar sealing device. Again, flexible seals 196, which are located along the perimeter of the interior walls 198 of the entrance port 192, along with the nip rollers 194, minimize vapor flow into the third processing chamber 190. A vacuum pump 200, which communicates with the third processing chamber 190 through fluid outlet port 202, maintains an absolute pressure in the third processing chamber 190 that is less than the pressure within the second processing chamber 174. Furthermore, the absolute pressure in the final or third processing chamber 190 should be low enough so that any residual replacement fluid within the fibers 154 from the preceding processing chamber will vaporize. This vaporization dislodges occluded air and other noncondensable gases from within and between the individual strands that comprise the fibers 154. The layers of fibers 154 are again separated by transverse supports 204 to aid transport of vaporized replacement fluid and noncondensable gas from within the fibers 154. Because vaporization cools the fibers 154, the fibers 154 pass over transverse heating bars 206 to ensure complete vaporization of the replacement fluid before the fibers 154 leave the third processing chamber 190 at an exit port 208. From the exit port 208, the degassed fibers 154 are typically sent directly to stage II mixing with the primary liquid phase; e.g., resin injection.

As part of a vapor recovery system, replacement fluid vapor from the third processing chamber 190 is conveyed from fluid outlet port 202 through recovery line 210 to a first condenser 212. Condensed replacement fluid, and trace amounts of dissolved noncondensable gas, are returned to the second processing chamber 174 through recycle line 214. Replacement fluid recycled from the third processing chamber 190 is injected into the second processing chamber 174 through perforated tubes 216, which, like the transverse support, also separate and support the various layers of fibers 154. Introducing the recycled replacement fluid between the layers of fibers 154 ensures intimate contact between the fibers 154 and the replacement fluid vapor.

Finally, we describe further details of the replacement fluid recovery system. Replacement fluid vapor and entrained noncondensable gas leaving the first processing chamber 156 through fluid outlet port 170 are transported to a second condenser 214 via exhaust pipe 216, where the bulk of the replacement fluid is condensed. Noncondensable gases from the second condenser 214, and also from the fluid outlet port 186 of the second processing chamber 174, are transported through lines 218, 220 to a fluid recuperation system 222—gas stripping unit, gas adsorption unit, and the like—which discharges clean air through vent 224 to the atmosphere. Condensed replacement fluid from the fluid recuperation system 222, the second condenser 214, the second processing chamber 174, and the third processing chamber 190, are conveyed through lines 226, 228, 230, and 232, respectively, to a surge tank 234. When closed, a pair of valves 236, 238 located in the lines 230, 232 between the second 174 and third 190 processing chambers and the surge tank 234, allow condensed replacement fluid to collect in the bottom of the two processing chambers. Recycled replacement fluid from the surge tank 234 is conveyed to a boiler 240 through line 242; makeup replacement fluid is provided through line 244. The boiler 240 vaporizes the replacement fluid, which is conveyed to the fluid inlet port 168 of the first processing chamber 156 through feed line 246.

Figure 11:
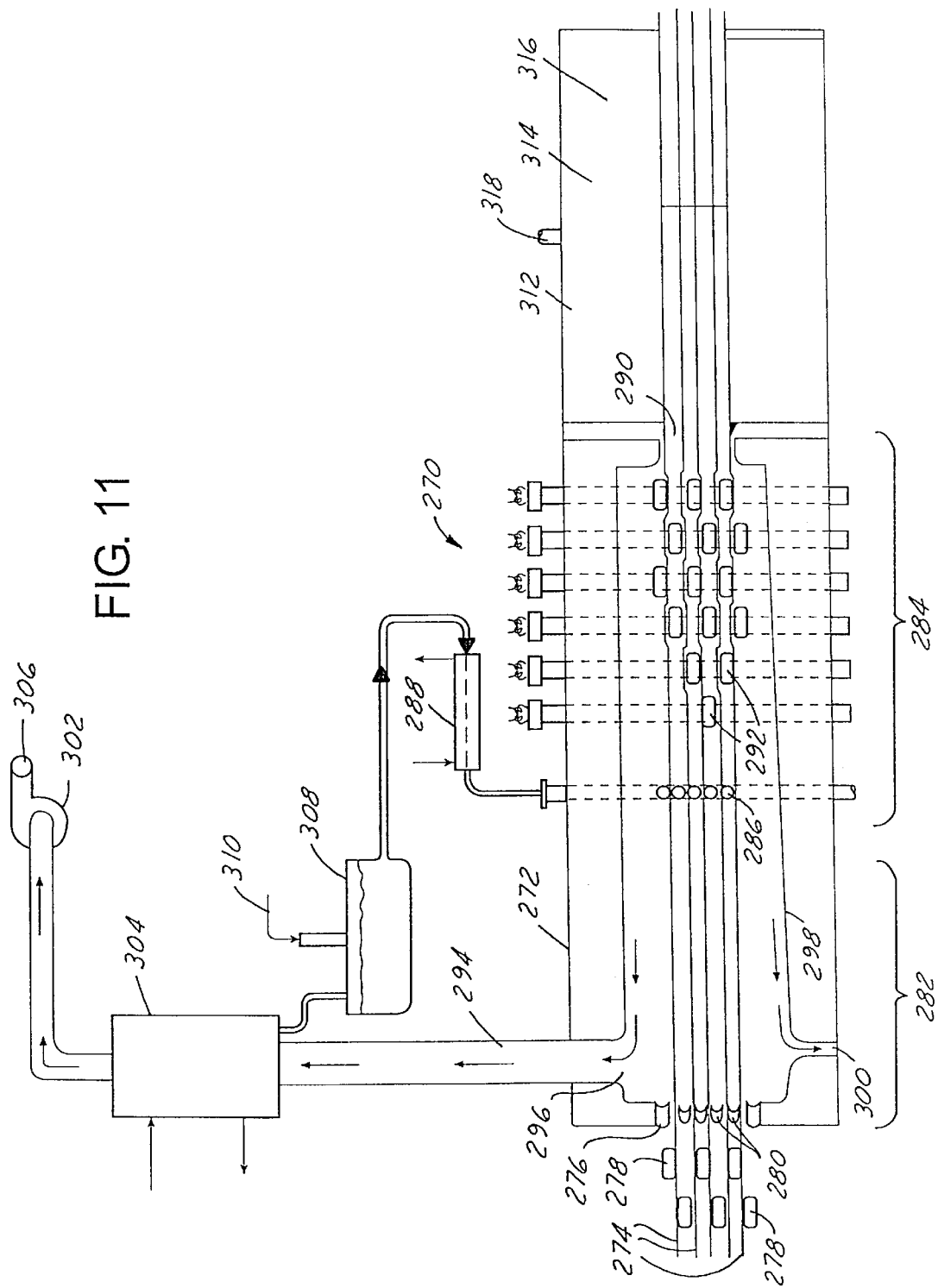
FIG. 11 is a schematic drawing of an apparatus for continuously de-airing fibers under ambient pressure.

FIG. 11 illustrates a third embodiment of an apparatus for continuously de-airing fibers with a replacement fluid prior to immersion in the degassed primary liquid phase. Unlike the washing equipment shown in FIGS. 9a, 9b and 10, the apparatus shown in FIG. 11 operates at about atmospheric pressure.

The fiber washing apparatus 270 shown in FIG. 11 is comprised of a pressure vessel 272 having two distinct psychrometric processing zones. Single or multi-layered continuous fibers 274 enter the pressure vessel 272 through an entrance port 276. The fibers 274 slide over cooling bars 278 located immediately upstream of the entrance port 276 to adjust the temperature of the incoming fibers 274. Within the entrance port 276, each of the fiber layers 274 pass between transverse, flexible seals 280 that minimize atmospheric air intrusion into the pressure vessel 272.

The fibers 274 are bathed in a saturated vapor of a replacement fluid immediately downstream of the entrance port 276 in a condensation zone 282. Because the entering fibers 274 are substantially cooler than the saturated vapor, the replacement fluid condenses on the fibers 274. The wetted fibers 274 then enter a vaporization or an evaporation zone 284 located downstream of the condensation zone 282. At the entrance to the evaporation zone 284, liquid-phase replacement fluid is injected into the fibers 274 through transverse perforated tubes 286 that are in fluid communication with a heat exchanger 288 located external to the pressure vessel 272. As the fibers 274, which are thoroughly saturated with replacement fluid, move towards an exit port 290, they pass over transverse heating bars 292, which vaporize the replacement fluid within the fibers 274. This vaporization dislodges occluded air and other noncondensable gases from within and between the individual strands that comprise the fibers 274. The stream of vaporized replacement fluid and entrained noncondensable gases flow towards the condensation zone 282 where a portion of the replacement fluid condenses on the entering fibers 274. The bulk of the noncondensable gases, as well as a portion of the vapor-phase replacement fluid, exit the pressure vessel 272 through an exhaust pipe 294 located along the top 296 of the condensation zone 282. Excess condensate falls to the tapered bottom 298 of the condensation zone 282, where it drains through an orifice 300.

The lower pressure in the condensation zone 282 is maintained by a pump 302, which communicates with the condensation zone 282 through exhaust pipe 294. The exhaust pipe 294 conveys the vapor-phase replacement fluid and entrained noncondensable gases to a condenser 304, where most of the replacement fluid is condensed. Noncondensed replacement fluid and noncondensable gases are either vented to the atmosphere at the pump 302 discharge 306 or are sent to an incinerator, gas adsorption unit, etc., for further treatment. The condensed replacement fluid from the condenser 304 is collected in a surge tank 308; the recycled replacement fluid, along with makeup replacement fluid from a replacement fluid source 310, is sent to the heat exchanger 288 for injection into the evaporation zone 284 of the pressure vessel 272 through the perforated tubes 286.

Washed fibers leaving the pressure vessel 272 through exit port 290 are substantially dry and can be sent directly to resin injection 312, forming 314 and curing 316 dies. The primary liquid phase or resin is introduced into the resin injection die 312 through a resin inlet port 318. Although only a trace amount of vapor-phase replacement fluid remains in the fibers 274 leaving the exit port 290, the replacement fluid condenses by the time the fibers 274 enter the forming die 314 because of the high pressures in the resin injection die 312. The fiber reinforced composite is shaped in the forming die 314, and is then heated in the curing die 316 to polymerize the primary liquid phase. Note, the replacement fluid is generally chosen to chemically react or polymerize within the primary liquid phase, and therefore becomes part of the solid polymer matrix as well.

Figure 12:
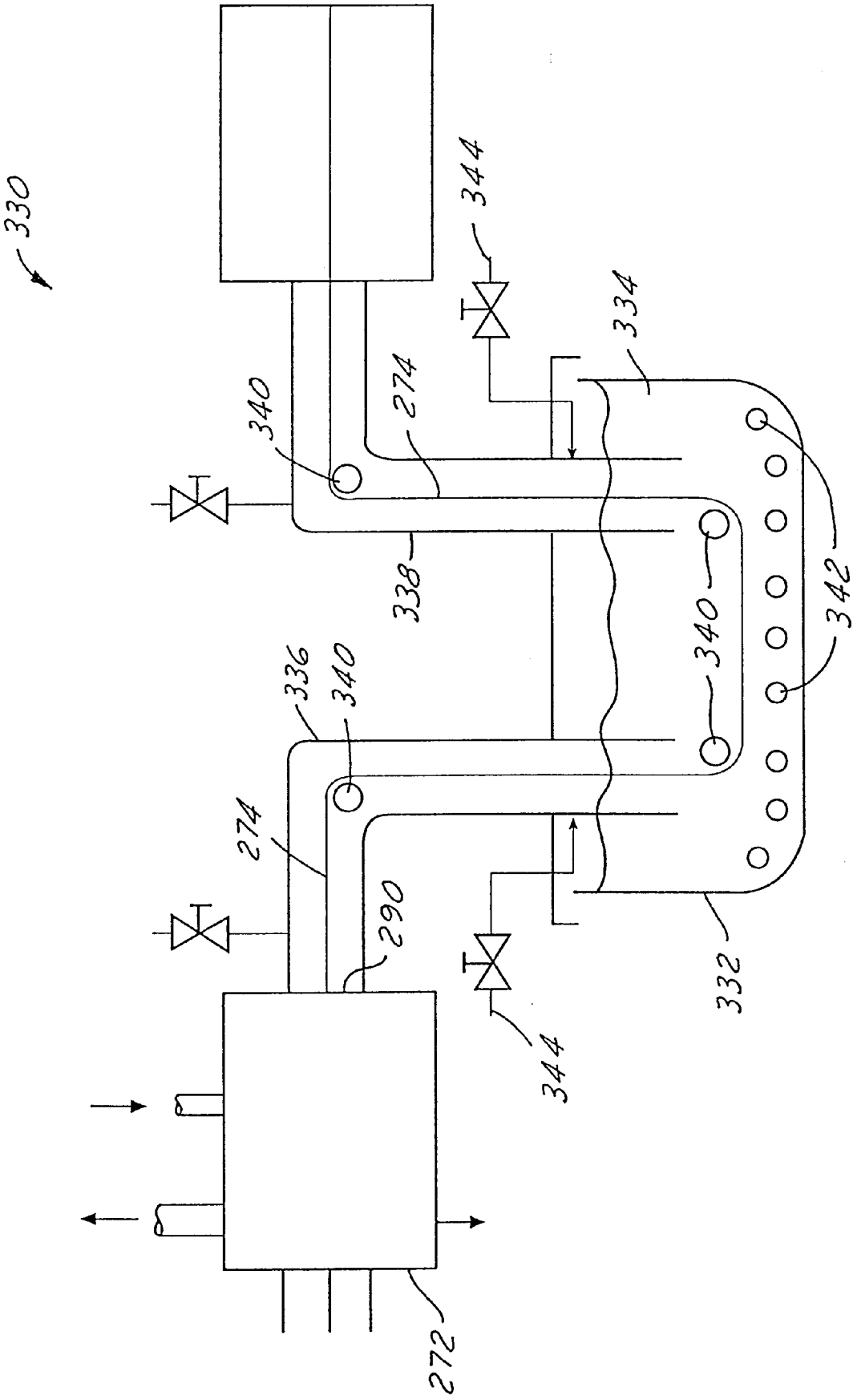
FIG. 12 is a modified pultrusion apparatus for use with the apparatus shown in FIG. 11.

Instead of passing directly into the resin injection die 310 of FIG. 11, the washed fibers 274 can be sent to a modified pultrusion apparatus 330 shown in FIG. 12, where the dry fibers are immersed in a resin tank 332 containing a degassed primary liquid or resin 334. The single or multiple layer fibers 274 leave the pressure vessel 272 of FIG. 11 via the exit port 290, and are conveyed to the resin tank through a conduit 336. After immersion in resin 334, the fibers exit the resin tank 332 through another conduit 338. The conduits 336, 338 and resin tank 332 are provided with transverse supports 340 to channel the fibers 274 through the pultrusion apparatus 330. The resin tank 332 contains heat exchanger tubes 342 to control the temperature of the resin 334. Note, the conduits 336, 338 are in fluid communication with a source of replacement fluid vapor 344 that can be used to fill the conduits 336, 338 with replacement fluid as needed.

The present invention can be implemented in many apparatus, methods and processes to produce a variety of void-free compounds and composites. Accordingly, the scope of the invention should be determined by the claims and not limited to the preferred embodiments described above.

What is claimed is:

1. A psychrometric apparatus for replacing occluded noncondensable gases in continuous fibers with a condensable replacement fluid comprising:

a pressure vessel having an inlet and an outlet, a condensation zone located adjacent to the pressure vessel inlet, and an evaporation zone located adjacent to the pressure vessel outlet, wherein the continuous fibers enter the pressure vessel inlet, travel downstream through the condensation zone and the evaporation zone, and exit the pressure vessel through the pressure vessel outlet;

a fluid inlet port in the pressure vessel for injecting the continuous fibers with the replacement fluid; and an exhaust port for venting vapor-phase replacement fluid and noncondensable gases from the pressure vessel;

wherein saturated vapor of the replacement fluid condenses on the continuous fibers under conditions within the condensation zone, and the condensed replacement fluid vaporizes under conditions within the evaporation zone, so that occluded noncondensable gases are dislodged from the continuous fibers and swept out of the pressure vessel by vaporized replacement fluid venting through the exhaust port.

2. The apparatus of claim 1, wherein the condensation zone is a first chamber and the evaporization zone is a second chamber, the first chamber and the second chamber separated by at least one seal that reduces flow of the replacement fluid between the first and second chambers.

3. The apparatus of claim 2, further comprising a vacuum system for maintaining the second chamber at a pressure less than the first chamber.

4. The apparatus of claim 2, further comprising exhaust ports for venting vapor-phase replacement fluid and noncondensable gases from the first and second chambers.

5. The apparatus of claim 2, wherein the pressure vessel includes a third chamber separating the first and second chambers.

6. The apparatus of claim 5, further comprising a vacuum system for maintaining the third chamber at a pressure less than the second chamber and the second chamber at a pressure less than the first chamber.

7. The apparatus of claim 5, further comprising exhaust ports for venting vapor-phase replacement fluid and noncondensable gases from the first, second and third chambers.

8. The apparatus of claim 1, further comprising heat transfer bars located upstream of the pressure vessel inlet for controlling the temperature of the continuous fibers as they contact the temperature control bars.

9. The apparatus of claim 8, wherein the heat transfer bars cool the continuous fibers.

10. The apparatus of claim 1, further comprising heating bars located within the evaporation zone for heating the continuous fibers as they contact the heating bars.

11. The apparatus of claim 1, further comprising supports for separating the continuous fibers into layers, the supports mounted transverse to the direction of travel of the continuous fibers within the pressure vessel.

12. The apparatus of claim 1, wherein the fluid inlet port is located within the evaporization zone.

13. The apparatus of claim 1, wherein the exhaust port is located within the condensation zone.

14. The apparatus of claim 1, wherein the pressure vessel includes a drain for recovering condensed replacement fluid.

15. The apparatus of claim 1, further comprising a resin injection die located downstream of the pressure vessel outlet.

16. The apparatus of claim 1, further comprising a forming die located downstream of the pressure vessel outlet.

17. The apparatus of claim 1, further comprising a curing die located downstream of the pressure vessel outlet.

18. The apparatus of claim 1, further comprising a pultrusion tank located downstream of the pressure vessel outlet, the pultrusion tank in fluid communication with the evaporization zone of the pressure vessel.

19. The apparatus of claim 1, further comprising a vapor recovery system for separating the vaporized replacement fluid from the noncondensable gases vented from the pressure vessel.

* * * * *